United States Patent [19]
Pelly et al.

[11] Patent Number: 5,751,530
[45] Date of Patent: May 12, 1998

[54] HIGH POWER DC BLOCKING DEVICE FOR AC AND FAULT CURRENT GROUNDING

[75] Inventors: Brian R. Pelly. Palos Verdes Estates, Calif.; Henry N. Tachick. Pound, Wis.

[73] Assignee: Dairyland Electrical Industries, Inc., Oregon, Wis.

[21] Appl. No.: 696,116

[22] Filed: Aug. 13, 1996

[51] Int. Cl.$^6$ .................................................. H02H 9/00
[52] U.S. Cl. ................................... 361/56; 361/35; 361/42
[58] Field of Search .............................. 361/56, 55, 57, 361/35, 79, 84, 86-87, 44-45, 111, 110, 117-118, 42; 340/646, 660, 661, 664

[56] References Cited

U.S. PATENT DOCUMENTS

| | | |
|---|---|---|
| 2,087,340 | 7/1937 | Davis . |
| 3,198,989 | 8/1965 | Mahoney . |

(List continued on next page.)

FOREIGN PATENT DOCUMENTS

| | | |
|---|---|---|
| 1367890 | 9/1974 | United Kingdom . |
| 2160721 | 12/1975 | United Kingdom . |

OTHER PUBLICATIONS

Brochure by Kirk Engineering Co. Inc. describing the "Kirk Cell" electrolytic switch, 1989.

H.A. Cloud, et al., "Stray Voltage Problems with Dairy Cows", North Central Regional Extension Publication 125, Agricultural Extension Service, University of Minnesota, 1980.

Letter dated Dec. 3,1993, from Paul Fleury of Marine Services to Technical Director, American Boat and Yacht Council, Inc.

Paper dated Jan. 3, 1993, entitled "Galvanic Isolator, Installation Instructions, Quicksilver Part # 18478A1".

Paper dated Dec. 28, 1993 entitled "Testing Galvanic Isolators".

Paper by Marine Services dated Jan. 12,1994, entitled "Galvanic Isolator".

Product brochure published by Dairyland Electrical Industries, Inc. for Solid–State Isolator/Surge Protector, published in the United States prior to Dec. 21, 1992.

Addendum to Isolator/Surge Protector Brochure by Dairyland Electrical Industries, Inc., published in the United States prior to Dec. 21, 1992.

Letter from Henry N. Tachick of Dairyland Electrical Industries, Inc. to R. S. Howard of Los Angeles Dept. of Water and Power describing a proposal for an isolator surge protector, dated Mar. 13, 1989.

*Primary Examiner*—Jeffrey A. Gaffin
*Assistant Examiner*—Michael Sherry
*Attorney, Agent, or Firm*—Foley & Lardner

[57] ABSTRACT

A high power DC blocking device is provided which blocks DC current, passes AC current, and limits the voltage across it under fault conditions. A DC blocking capacitor is used to block the flow of DC current, while allowing the passage of normal AC currents. A main bypass path includes switching devices which provide a low impedance path across the capacitor under fault conditions. Auxiliary switching devices are used to connect a storage capacitor across the device at the initiation of a fault, thereby charging the storage capacitor to a stored voltage level before the main switching devices are fired. After the fault passes, the auxiliary switching devices are fired once again to apply the stored voltage in the storage capacitor to the main switching devices to commutate them off. The storage capacitor and auxiliary switching devices also form part of a voltage clamp circuit which dissipates inductive energy stored in a system to which the DC blocking device is connected. Multiple backup firing circuits are provided which activate the low impedance bypass path in the event of failure of the main firing circuits or of the blocking device control system. The effectiveness of the DC blocking device is continuously monitored using a DC current sensing circuit which is capable of distinguishing small DC currents in the presence of large AC currents.

35 Claims, 23 Drawing Sheets

U.S. PATENT DOCUMENTS

| | | |
|---|---|---|
| 3,213,349 | 10/1965 | Gutzwiller . |
| 3,571,660 | 3/1971 | Phillips . |
| 3,636,409 | 1/1972 | Stephens, Jr. et al. . |
| 3,769,926 | 11/1973 | Race . |
| 3,904,931 | 9/1975 | Leidich . |
| 3,930,977 | 1/1976 | Wood . |
| 3,932,791 | 1/1976 | Oswald . |
| 3,947,759 | 3/1976 | Briggs ............................ 324/509 |
| 3,997,818 | 12/1976 | Bodkin . |
| 4,117,345 | 9/1978 | Balcom . |
| 4,118,749 | 10/1978 | Matuzaki et al. . |
| 4,158,150 | 6/1979 | Dever . |
| 4,186,418 | 1/1980 | Seiler . |
| 4,217,618 | 8/1980 | Kellenbenz et al. . |
| 4,237,509 | 12/1980 | Asplund . |
| 4,297,739 | 10/1981 | Goldin et al. . |
| 4,321,644 | 3/1982 | Brasfield . |
| 4,322,767 | 3/1982 | El Hamamsy et al. . |
| 4,331,884 | 5/1982 | Svedberg . |
| 4,475,139 | 10/1984 | Chadwick . |
| 4,491,742 | 1/1985 | Akamatsu . |
| 4,509,089 | 4/1985 | Svedberg . |
| 4,571,535 | 2/1986 | Gyugyi ............................ 323/211 |
| 4,688,134 | 8/1987 | Freeman et al. ................. 361/45 |
| 4,697,219 | 9/1987 | Mitsuoka . |
| 4,713,604 | 12/1987 | Becker et al. ................... 324/500 |
| 4,807,081 | 2/1989 | Crofts et al. .................... 361/56 |
| 4,958,250 | 9/1990 | Kotski . |
| 5,155,674 | 10/1992 | Tanoue et al. . |
| 5,436,786 | 7/1995 | Pelly et al. . |

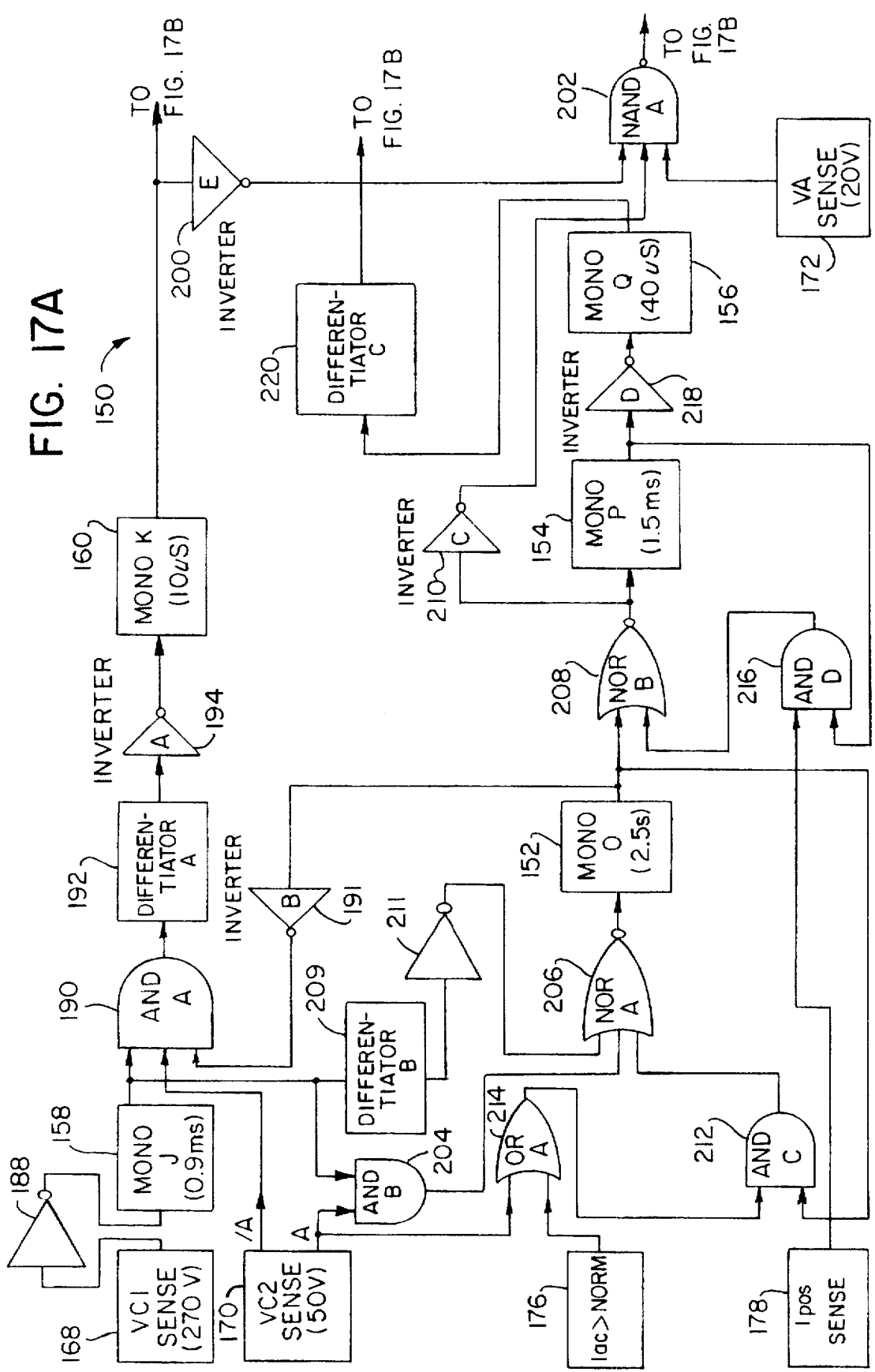

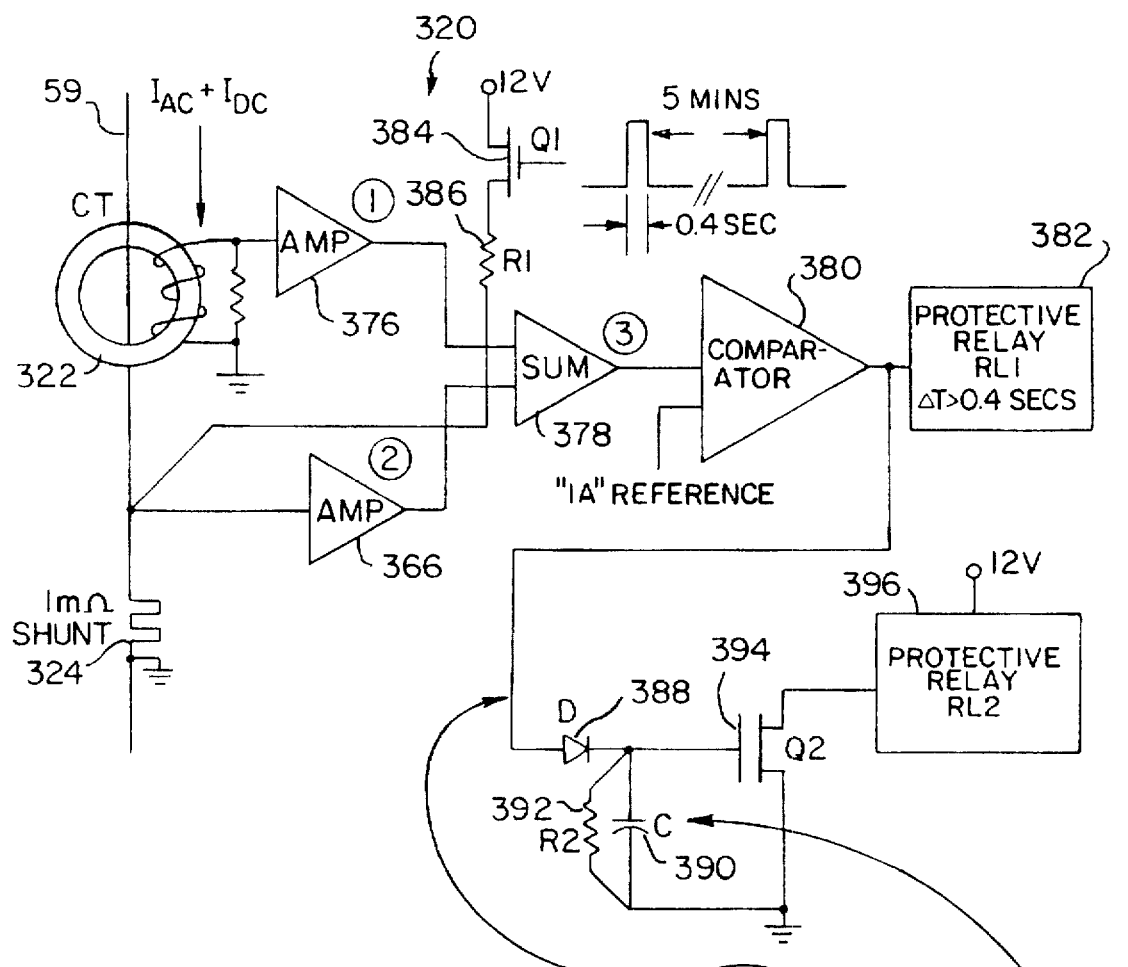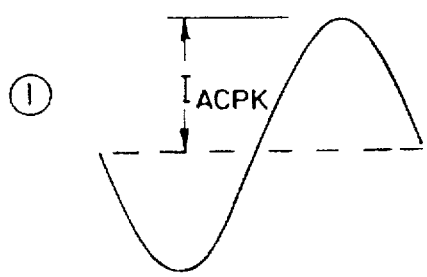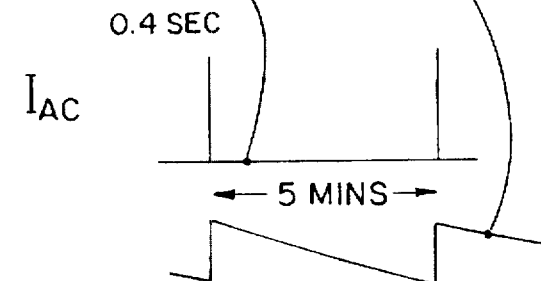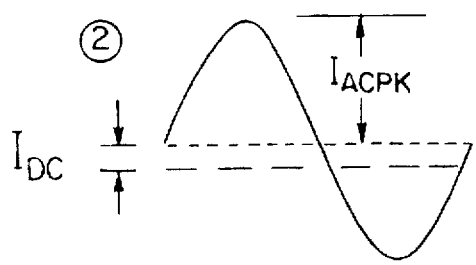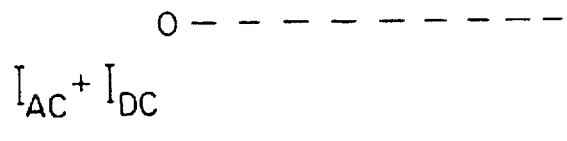
FIG. 24

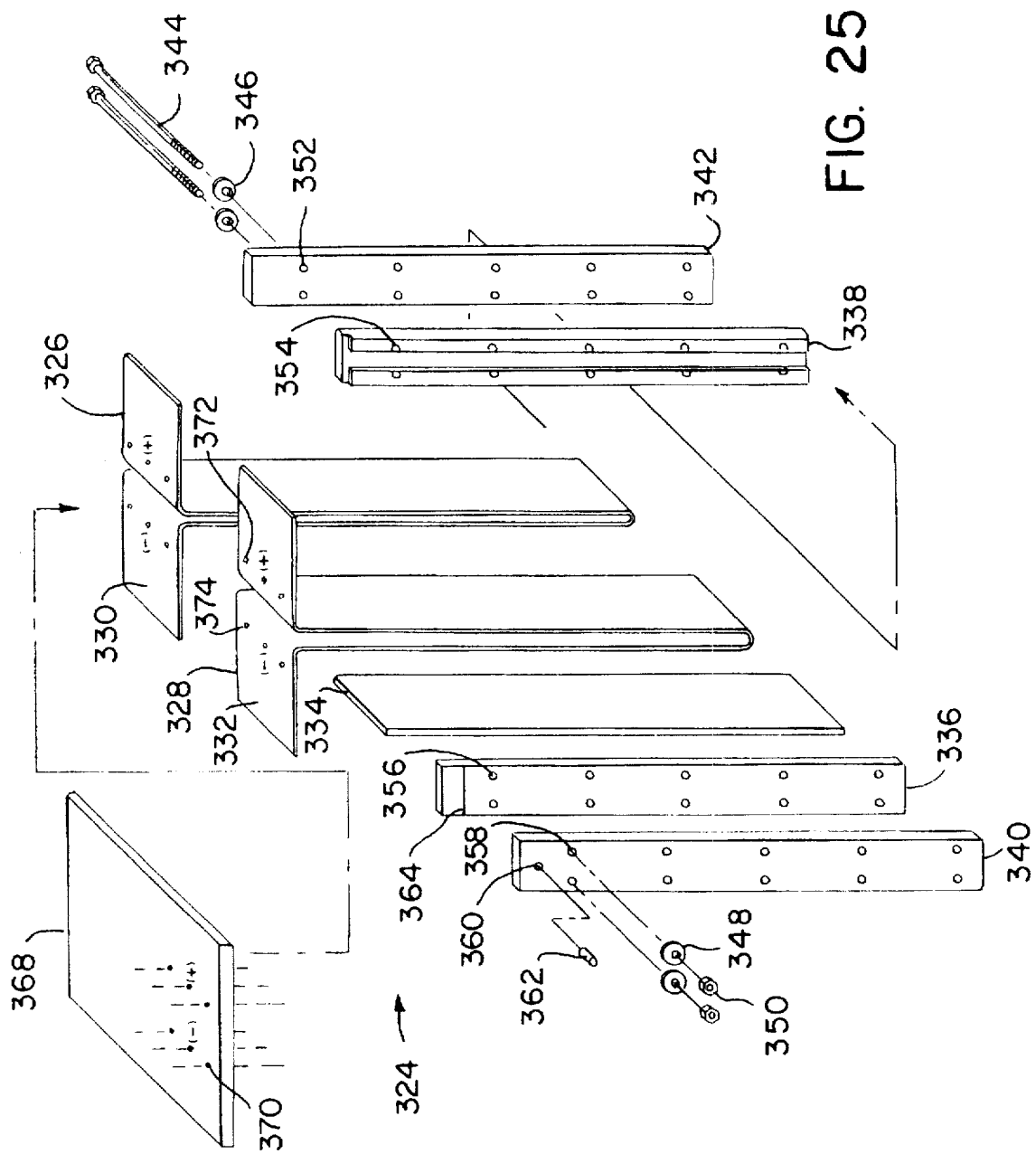

HIGH POWER DC BLOCKING DEVICE FOR AC AND FAULT CURRENT GROUNDING

This application claims the benefit of U.S. Provisional application Ser. No. 60/002,498, filed Aug. 18, 1995.

FIELD OF THE INVENTION

This invention pertains generally to the field of high power AC electrical systems and apparatus therefor, and more particularly to devices for blocking the flow of DC current in such systems while providing AC and fault current grounding.

BACKGROUND OF THE INVENTION

High power transformers are used for the transmission and distribution of electrical power. These three phase transformers include a neutral line which is connected to ground. Unwanted stray DC current can flow from ground into the transformer through this neutral to ground connection. Such transformers are not designed to accommodate a DC current flowing through the transformer windings. DC currents as low as several amperes can cause partial core saturation, resulting in excessive power losses in the transformer (i.e., excessive heating), a drop in system voltage, the introduction of undesirable harmonics, and a significant increases in noise level. Sources of DC current that can cause this problem include geomagnetically induced currents (GIC) caused by solar flares, stray DC current from rapid transit systems typically found in large cities, and stray DC current associated with high-voltage DC transmission systems, particularly when operating in the monopolar mode (i.e., earth return mode).

Unwanted DC current can be blocked by inserting a DC blocking device between the transformer neutral connection and ground. This device must both block DC current and simultaneously allow the flow of normal AC current to ground. The device must also allow for the flow of transient fault currents to ground. Such fault currents can be several orders of magnitude higher than the normal currents found in the transformer.

DC blocking devices may also be used in association with systems which protect metal structures against corrosion by the application of a DC bias voltage. Many metallic structures and systems are protected against corrosion by cathodic methods. For example, metallic gas transmission and distribution lines are protected against corrosion to prevent gas leaks, particularly in certain environments. Metal encased high-voltage underground transmission lines, and the metal hulls of ships, are other examples of metallic objects which are often cathodically protected.

The most common method of cathodic corrosion protection of metallic systems is to apply a negative DC potential to the system to be protected. The negative DC potential applied to the system will typically be in the 0.6 volt to 3.0 volt range relative to ground. The cathodically protected system is isolated from ground to prevent the flow of DC current from the protected system. While this procedure helps eliminate corrosion, it introduces a potential safety problem. Often, the protected system is an inherent part of an AC power system, or is coupled to such a power system through resistive, capacitive, or inductive coupling. In the event of a fault, e.g., a short circuit, within the power system, or between the power system and the protected device, the voltage on the electrically isolated corrosion protected system may rise to unsafe levels.

To prevent such cathodically protected systems from reaching unsafe voltage levels in the event of a fault, lightning, switching transient, or other system disturbance, it is desirable that the protected system be connected to ground through a DC blocking device. The blocking device presents a high impedance to DC, at least up to the DC voltage level of interest, but presents a low impedance to AC at all times so that the voltage level on the corrosion protected system is limited to values safe for personnel and equipment.

A prior art device for providing such a function is a polarization cell. A polarization cell is an electromechanical device which has the ability to present a relatively high impedance to DC (up to about 1.2 volts DC) and simultaneously present a low impedance to AC. Due to the relatively low DC blocking level of polarization cells, it is often necessary to connect several polarization cells in series to isolate the desired DC voltage level. Moreover, as an electromechanical device, the polarization cell requires routine maintenance. Also, the polarization cell contains an electrolyte which is extremely caustic and hazardous and which requires eventual disposal.

Another application of DC blocking devices is for the prevention of stray electrical currents associated with farm installations, particularly dairying equipment. Such stray electrical currents can present a significant economic problem for farm operations. Dairy operations are susceptible to stray electricity because cows are extremely sensitive to electricity, much more so than humans, and will respond to potentials as low as one volt or less. One solution to such a problem is to insert a blocking device between the primary and secondary neutrals of the distribution transformer serving the farm. The blocking device opens the link between the transformer neutrals during normal operation, and closes the link very rapidly anytime the voltage between the neutrals exceeds the predetermined level. Such an over voltage might be caused by a transformer failure, lightning surge, or other surge condition. For dairy farm applications, a blocking device will normally be required to block normal AC currents as well as DC.

Prior DC blocking devices, also known as isolator surge protectors (ISPs), have included a main DC blocking capacitor which prevents the flow of DC current, while allowing the flow of normal AC currents to ground. These ISPs preferably also include a bypass circuit, which provides a low impedance path across the capacitor when the voltage across the capacitor exceeds a predetermined level as a result of an AC or DC fault or surge condition. High speed electronic switching devices capable of handling large currents, such as silicon controlled rectifiers (SCRs), have been used to implement the low impedance bypass path. However, for applications in which the DC blocking device is connected to systems which are subject to an external DC bias, such as cathodically protected systems, the external DC bias may be greater than the turn-off voltage of the switching devices employed in the bypass circuit. Thus, the external DC bias can operate to hold the electronic switches of the blocking device in a conductive state, thereby maintaining the low impedance path, and bypassing the DC blocking capacitor, even though the event which caused the triggering of the switches has ended. In such a state, the bypass path is stuck in conduction, with the external DC bias preventing proper operation of the DC blocking device.

The isolation surge protector described in U.S. Pat. No. 5,436,786, to Pelly, et al., resolves the problem of a DC blocking device being stuck in conduction by the presence of a DC bias voltage. In accordance with Pelly, et al., a blocking device includes an auxiliary bypass path which short circuits the high current capacity SCRs of the main bypass path after the triggering event has passed. The auxiliary path thus shunts the DC current which is maintaining the SCRs in a conducting state away from the SCRs, so that the voltage across the SCRs falls below their holding voltages. Thus, the SCRs will not become permanently stuck in conduction by the external DC bias.

The basic purpose of any DC blocking device is to restrict the flow of DC current to or from the system to which the device is connected. In many applications, it will be important to ensure that the blocking device is performing this function properly. One way of ensuring proper performance is to continually monitor for a DC current component through the blocking device, and to activate an alarm if the DC current exceeds a certain limit. Such an alarm would indicate a failure of the DC blocking device. For high power applications, however, such an alarm system requires a current sensing device which can accurately discern a DC current of approximately 1 A within a normal AC operating current of, e.g., 120 Amps rms with a peak current of 170 A. Such a current sensing device must also be able to handle fault currents of several tens of thousands of amps AC rms without being damaged. These requirements can not be met with currently commercially available current sensing devices. For example, available Hall-Sensor current transformers do not have the required accuracy. Moreover, these sensors cannot sustain the high surge currents required without experiencing loss of accuracy after the fault occurrence, or, even worse, complete destruction of the sensor.

SUMMARY OF THE INVENTION

In accordance with the present invention, a high power DC blocking device is provided which blocks DC current, passes AC current, and self-limits the voltage across it under current fault conditions. The DC blocking device provided is particularly suitable to application in the neutral to ground connection of three phase high power transformers used for the transmission or distribution of electrical power. However, the present invention may also be effectively employed in any application requiring the blocking of DC current and the passing of normal AC currents and AC and DC fault currents. One such alternative application includes connecting a cathodically protected metal structure to ground. The blocking device of the present invention is also effective for blocking very low frequency AC currents, i.e., AC currents at a frequency of less than approximately 1 Hz. Such low frequency AC currents are quasi-DC. Geomagnetic induced currents (GIC) are examples of such low frequency AC currents. GICs are time varying at a frequency which is typically a fraction of 1 Hz. Thus, GICs are typically treated as DC currents.

The DC blocking device of the present invention includes a DC blocking capacitor which blocks normal levels of DC current while allowing the free flow of normal AC currents. A main bypass path is connected across the DC blocking capacitor. This bypass path includes high power switching devices, such as SCRs, which are turned on to provide a low impedance bypass path across the DC blocking device under fault conditions. An auxiliary bypass path is connected in parallel with the DC blocking capacitor and main bypass path. The auxiliary bypass path includes a storage capacitor connected in series with a set of auxiliary switching devices. The auxiliary switching devices and storage capacitor are used to commutate off the main bypass path switching devices after a fault condition has passed. Thus, the main bypass path of the blocking device will not become stuck in conduction due to the presence of DC currents on the system being protected by the device.

During normal operation, DC currents are blocked by the DC blocking capacitor which passes normal AC currents. When a fault occurs, the voltage across the blocking capacitor rises rapidly. Sensing this voltage rise, the control system of the DC blocking device turns on the switching devices in the auxiliary bypass path for a short period of time. The auxiliary switching devices are turned on for a sufficient amount of time to allow the fault current to charge the storage capacitor, which is connected in series with the auxiliary switching devices, to a pre-selected stored voltage level. When the storage capacitor is sufficiently charged, the control system turns on the main bypass path switching devices, thereby providing a low impedance path through the blocking device which results in the auxiliary switching devices being turned off. The main bypass path conducts the fault current until the fault period passes.

After the external fault clears, the main bypass path switching devices are kept in conduction for a cooldown period before being turned off. The ability of an SCR to turn off and block re-applied voltage may be significantly degraded immediately after carrying a surge current, due to high junction temperatures reached during a surge. The cooldown period allows the SCR's time to cool before attempting to turn them off. After the cooldown period has passed, and the control system checks to ensure that the fault has permanently cleared, the main bypass path SCRs are turned off by turning back on the auxiliary bypass path.

Due to the presence of an external DC voltage on the system being protected by the DC blocking device, a DC component of current will have built up in the main bypass path SCRs during the fault period. Therefore, the main bypass SCRs can become stuck in conduction with a unidirectional pulsating current (AC+DC current). In order to commutate off the main bypass path SCRs, the auxiliary bypass path SCRs are fired once again. The pre-captured voltage on the storage capacitor is thereby applied across the main SCRs, diverting the current from the main bypass path SCRs into the auxiliary bypass path SCRs. This extinguishes the main bypass path SCRs. Preferably, this commutation process is initiated when the AC current in the system is opposing the DC current, thus minimizing the current which must be commutated.

During the fault period, DC current is allowed to flow, along with the fault current, through the main bypass path. Thus, DC energy will become stored in the inductances associated with the system to which the DC blocking device is attached, as well as in the internal inductances of the DC blocking device itself. For example, DC energy may become stored in the windings of a power transformer and the transmission system to which the DC blocking device is connected. This stored DC energy will cause the voltage across the blocking device to rise once the main bypass path SCRs have been turned off, and could cause a false fault triggering. To dissipate this energy, a voltage clamp circuit is preferably provided which prevents any voltage rise beyond a certain level. The clamp bypasses the DC current into a resistor, which dissipates the stored system energy. The voltage clamp is preferably connected across the storage capacitor. The storage capacitor thus has a dual role. It acts as a storage device for voltage used to commutate off the main bypass path SCRs, and as a part of the voltage clamp circuit. When the DC component of current reaches zero, all the DC energy stored in the system inductances has been removed. The auxiliary bypass path SCRs thus turn off naturally, having become deprived of current. At this point, operation may return to its original pre-fault state.

Under fault conditions, triggering of the main and auxiliary SCRs is normally initiated via the blocking device control system. The control system sends timing signals to firing circuits which send isolated firing pulses to the gates of the SCRs. The control system may be implemented using discrete logic components, a programmable logic device, or in whole or in part using software implemented using a microprocessor.

It is preferable that backup firing circuits be provided for the main SCRs in the event of abnormal circumstances which prevent the main firing circuits from delivering the required firing pulses to the SCRs. This may occur due to failure of the control system, failure of the main firing circuits, or failure of the control system's or firing circuit's power supply. Preferably the backup firing circuits do not rely on any auxiliary power source, being powered directly from the instantaneous anode-cathode voltage across the main bypass path SCRs. Moreover, it is preferable that at least two sets of backup firing circuits be provided. Each set of backup firing circuits is fired at successively higher voltage levels across the DC blocking device. The primary backup firing circuit fires only if the main firing system fails. The secondary backup firing circuit fires the SCRs only if both the main firing system and primary backup firing system fail. Preferably at least the primary backup firing circuit is designed to ensure that all parallel SCRs in the main bypass path will be fired in order to evenly distribute high fault currents.

In order to ensure that the DC blocking device is performing its basic purpose of blocking DC current, the current through the DC blocking device is preferably continuously monitored for a DC current component. An alarm is activated if the DC current exceeds a current limit, about 1 A. A DC current sensing circuit is employed which combines the outputs of a shunt and a current transformer in phase opposition to cancel the AC component of the current. The shunt is designed to have a resistance which is as low as is practical, in order to limit power dissipation requirements under AC fault currents. The DC current sensing circuit is capable of separating a low amplitude DC current signal from a much greater amplitude AC current signal. The current sensing circuit also avoids the need for significantly added filtering that would give the current sensing circuit an unacceptably slow response. The current sensing circuit employed can accurately discern a DC current of 1 A within a normal current of 120 A AC rms, 170 A peak. Moreover, the current sensing circuit can handle AC fault currents of 27,000 A rms without being damaged. The DC current sensing circuit is itself continually monitored for proper operation.

Further objects, features and advantages of the present invention are apparent from the following detailed description when taken in conjunction with the accompanying drawings.

BRIEF DESCRIPTION OF THE DRAWINGS

In the drawings:

FIG. 24 is a schematic circuit diagram of a DC current sensing circuit used for monitoring operation of the DC blocking vice of the present invention.

FIG. 25 is an exploded perspective view of a current shunt assembly used in the DC current sensing circuit of FIG. 24.

DETAILED DESCRIPTION OF THE INVENTION

Figure 1:
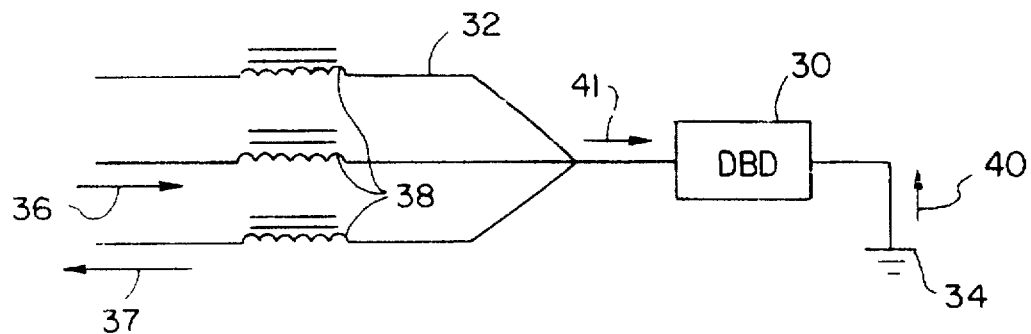
FIG. 1 a schematic circuit diagram of a high power three phase transformer system including a high power DC blocking device in accordance with the present invention, showing one application of the present invention.

With reference to the drawings, a schematic illustration of a DC blocking device in accordance with the present invention 30 connected to a three phase power transformer 32 is shown in FIG. 1 for purposes of illustrating one application of the present invention. The DC blocking device 30 is connected between the neutral of the wye-connected transformer 32 and ground 34. Normal balanced AC currents, indicated by arrows 36 and 37, sum to zero and thus circulate through the transformer windings 38. Unbalanced components of the AC current in the transformer 32, which are generally much smaller than the balanced components of the AC current, are allowed to pass freely through the blocking device 30 to ground 34 during normal operations. Contrarily, stray DC current, indicated by arrow 40, such as geomagnetically induced current (GIC), is blocked by the DC blocking device 30, and is prevented from flowing into the transformer 32. Similarly, unwanted DC current, indicated by arrow 41, such as current induced by cathodic protection systems, is prevented from flowing to ground through the transformer 32 by the blocking device 30. Under fault conditions, the DC blocking device 30 becomes an effective short circuit, allowing free flow of AC and DC fault currents from the transformer 32 through the blocking device 30 to ground 34.

Figure 2:
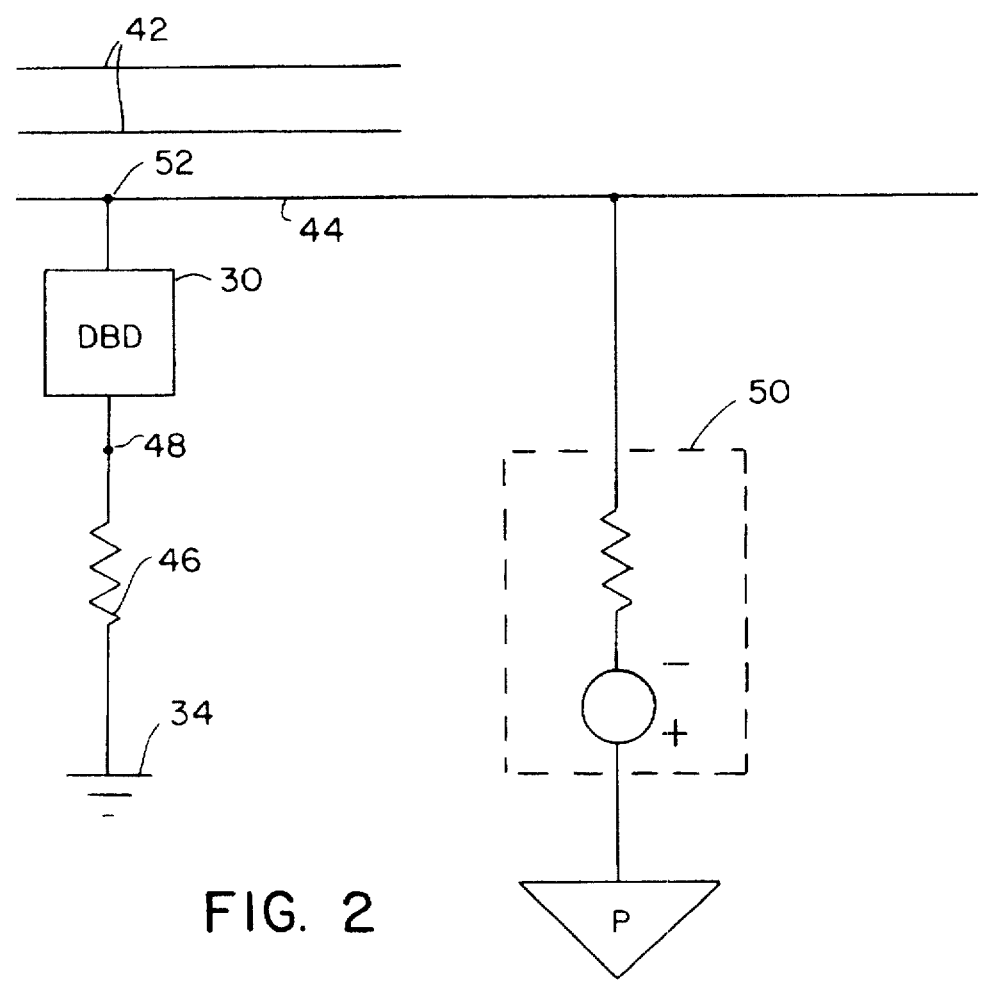
FIG. 2 is a schematic circuit diagram of a power system including a high power DC blocking device in accordance with the present invention, showing another application of the present invention.

A schematic view of the interconnection of power system lines 42 and a DC isolated structure 44 is shown in FIG. 2 for purposes of illustrating an alternative application of the DC blocking device 30 of the present invention. The isolated structure 44 may be, for example, a pipe used in a metal encased high voltage system, a ground stake, or a gas transmission line. Because of conducting line resistance, imperfect electrical contact with the structure 44, and the character of the ground 34, a certain finite resistance 46 exists between the structure 44 and the true ground potential, which is illustratively represented at a node 34 in FIG. 2. An external DC source 50 may be connected to the structure 44 to apply a DC bias voltage to the structure 44 to cathodically protect the structure from corrosion by minimizing the oxidation of the structure 44. The DC blocking device 30 may be connected to the structure 44 at node 52 and the ground 34 at node 48 as illustrated. The DC blocking device 30 normally presents a very high DC impedance between nodes 48 and 52 so that substantially no DC current flows between the nodes. Thus, DC voltages appearing on the structure 44 are not transmitted through the DC blocking device 30 to the ground 34. In the event, however, of a fault on the structure 44, such that voltages above a selected threshold voltage are applied to the structure 44, the DC blocking device 30 switches to provide a low impedance path between the nodes 48 and 52, thereby shunting any fault current back to the ground 34. For example, if the power system lines 42 short circuit to the structure 44, the DC blocking device 30 provides a path to ground 34.

A DC blocking device 30 in accordance with the present invention is described in more detail with reference to the schematic circuit diagram of FIG. 3. The embodiment of the DC blocking device 30 to be described is particularly well suited to application in the neutral to ground connection of a power transformer, as shown in FIG. 1. Thus, one terminal 54 of blocking device 30 may be considered connected to the neutral of a power transformer 32, with the other terminal 56 connected to ground 34. The component values shown in FIG. 3, and throughout the remainder of this description, as well as the voltage levels used in this description, will implement a DC blocking device for use with a high power transformer having the design specifications shown in Table 1. Of course, the present invention is not limited to this particular application, the particular component values described, nor the exemplary triggering levels presented. The particular example presented in this description is used, however, in order to more clearly explain the operation of the DC blocking device 30 of the present invention in general.

TABLE 1

| Exemplary DC Blocking Device Specifications | |
|---|---|
| NORMAL OPERATION: | |
| $V_{DC}$ | 50 V maximum |
| $I_{DC}$ | 100 A maximum |
| $I_{AC}$ | 120 A rms maximum |
| PERMISSIBLE PEAK AC VOLTAGE AT $I_{AC}$ | 130 V maximum |
| 60 $H_z$ FAULT: | |
| RMS SYMMETRICAL | 27,000 A |
| PEAK ASYMMETRIC FIRST CYCLE | 65,000 A |
| PERMISSIBLE PEAK TRANSIENT VOLTAGE* | 1500 V |
| LIGHTNING: | |
| PEAK 8/20 | 75,000 A |

*The design of the device limits the peak voltage that can appear across the device terminals to less than 1500 V regardless of the peak voltage the external system attempts to impress. The peak voltage level only occurs under lightning type transient conditions.

The DC blocking device 30 includes a DC blocking capacitor 58 connected between the terminals 54 and 56. The blocking capacitor 58 blocks DC current from passing between the terminals 54 and 56, while allowing the flow of normal AC operating current on the line 59. For a blocking capacitor 58 having a 60 Hz impedance of 0.76 ohms, at a normal maximum AC operating current of 120 amps, the peak AC operating voltage across the blocking capacitor 58 is: $\sqrt{2} \times 120 \times 0.76 = 130V$.

A varistor 60 is connected across the terminals 54 and 56 in parallel with the blocking capacitor 58. The varistor 60 is preferably a metal-oxide varistor providing protection of the DC blocking device circuit 30 from the very high currents (e.g., 75,000 A) associated with lightning strikes.

The remainder of the DC blocking device circuit 30 only plays a role under transient external system fault conditions. A main bypass path is connected in series with an inductor 61 across the terminals 54 and 56. The main bypass path includes an inductor 62 connected in series with a "forward" conducting switching device 64 and a "backward" conducting switching device 66 which are connected in parallel with each other. The switching devices 64 and 66 are preferably implemented as power switching devices capable of handling large fault currents, such as silicon controlled rectifiers (SCRs).

Figure 3:
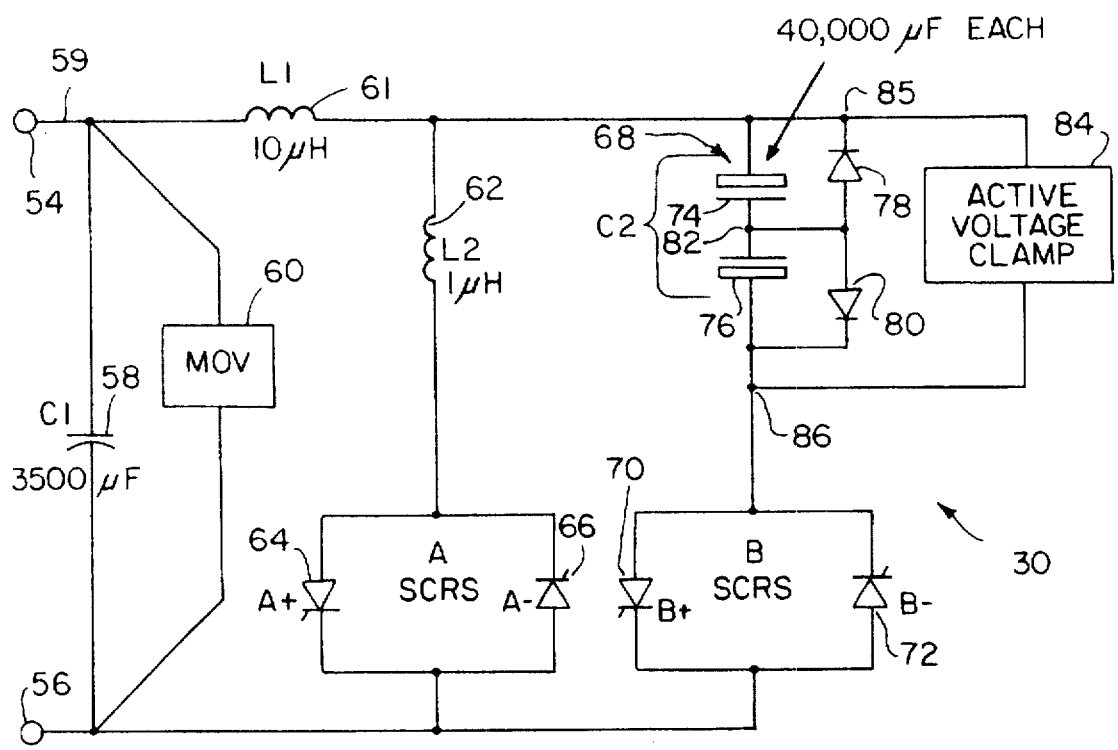
FIG. 3 is schematic circuit diagram of a high power DC blocking device in accordance with the present invention.
Figure 4:
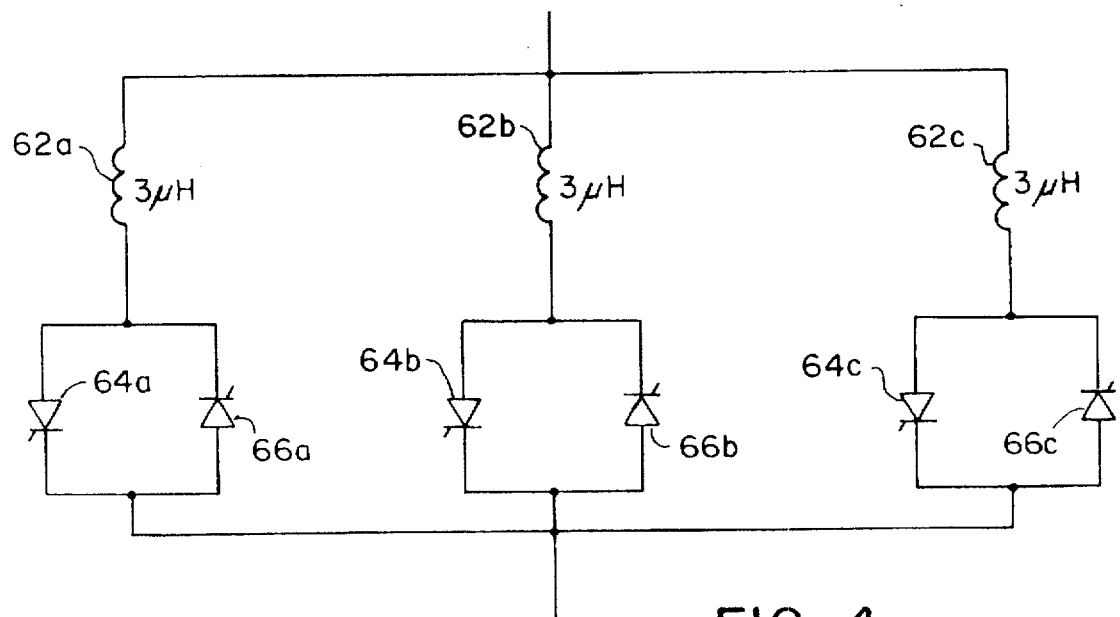
FIG. 4 is a schematic circuit diagram of multiple parallel pairs of SCRs and associated inductances for the main bypass path of a DC blocking device in accordance with the present invention.

While shown conceptually in FIG. 3 as a single inductor 62 in series with a single pair of SCRs 64 and 66, for high power applications it is preferable to implement the main bypass path using multiple pairs of SCRs 64a–c and 66a–c, with each pair connected in series with an inductance 62a–c, as shown in FIG. 4. Parallel SCR pairs are employed to increase the current handling capability of the blocking device 30. With parallel SCRs, high fault currents can be divided amongst the SCRs, minimizing the stresses on each individual SCR, and thereby minimizing the chances of SCR failure. In operation, all parallel SCRs 64a–c and 66a–c are fired simultaneously by pulses from the same firing circuit. The individual inductors 62a–c ensure that if one SCR turns on first, sufficient anode-cathode voltage is developed across the other SCRs for them to turn on also. For example, for a 10,000 amp, 60 Hz fault current, di/dt=5.3 A/μs. For the 3 μH inductors shown in FIG. 4, the voltage developed across any single conducting SCR pair and associated inductor will be L di/dt=5.3×3≈15V, which is sufficient voltage for the other SCRs to be turned on when the firing pulse, which may be delayed, reaches them. Of course, more or fewer than 3 SCR pairs may be employed in the main bypass path depending on the desired current handling capability of the blocking device 30. For simplicity of explanation, a single SCR pair and inductor will be referred to for the remainder of this discussion, it being recognized that the single SCR pair 64 and 66 and inductor 62 are the conceptual equivalent of the multiple pairs of SCRs 64a–c and 66a–c and inductors 62a–c shown in FIG. 4.

Connected in parallel with the main bypass inductor 62 and SCRs 64 and 66 is an auxiliary bypass path. The auxiliary bypass path consists of a storage capacitor 68 connected in series with the parallel combination of a "forward" conducting switching device 70 and a "backward" conducting switching device 72. Both switching devices 70 and 72 may be implemented as SCRS. As shown in FIG. 3, the storage capacitor 68 may be implemented as two unidirectional capacitors 74 and 76 connected in series, with each capacitor 74 and 76 connected in parallel with a diode 78 and 80, respectively. The anodes of the diodes 78 and 80 are connected together, and are also connected to the node 82 where the capacitors 74 and 76 are connected together. The resulting bridge structure allows capacitor 74 to be charged from a positive voltage on the terminals 54 and 56 by a current through diode 80, and capacitor 76 to be charged from a negative voltage on the terminals by a current through diode 78. A voltage clamp 84 is connected across the capacitor 68 at terminals 85 and 86. The operation of the voltage clamp 84 will be described in more detail below.

Under external system fault conditions, a voltage transient will force the voltage across the blocking capacitor 58 to exceed a preset trigger level, e.g., 270 volts. This causes the SCRs 64, 66, 70, and 72 to be fired in a sequence which ultimately results in a low impedance path for the fault current through the main bypass path SCRs 64 and 66, bypass path inductor 62, and inductor 61. For inductors 61 and 62 having a combined 60 Hz impedance of about 4 milliohms, the peak voltage across the blocking capacitor 58 will be kept to about √2×27 kA×4 mΩ=153 V under a maximum 60 Hz fault current of 27 kA.

If, at the initial triggering instant of a fault, a requisite stored voltage level does not already exist across the storage capacitor 68, the auxiliary SCRs 70 and 72 are turned on prior to the main bypass path SCRs 64 and 66. This causes current to flow to the auxiliary bypass path and into the capacitor 68 which captures a predetermined voltage level. This voltage stored in the capacitor 68 will be used later to commutate off any DC current in the main SCRs 64 and 66 which may have built up during the fault interval. Capturing a voltage on storage capacitor 68 from the external system, e.g., the transformer 32, connected to the terminals 54 and 56 avoids the need for an independent power source to charge the capacitor 68. This makes it possible for the DC blocking device 30 to be fully autonomous. When the requisite voltage level on the storage capacitor 68 is reached, the main SCRs 64 and 66 are fired to provide a low impedance path for the fault current.

A more detailed description of the operation of the DC blocking device 30 in response to a fault condition is described with reference to FIG. 5. Prior to time to, the AC current $I_{AC}$, flowing into the DC blocking device 30 is normal. Since there is no DC current flow through the capacitor 58 the total current 90 includes only an AC component. All of the SCRs, 64, 66, 70, and 72 are turned off. The voltage across the DC blocking device 30 is $I_{AC} \times X_{C1}$, where $X_{C1}$ is the impedance of the blocking capacitor 58.

Figure 6:
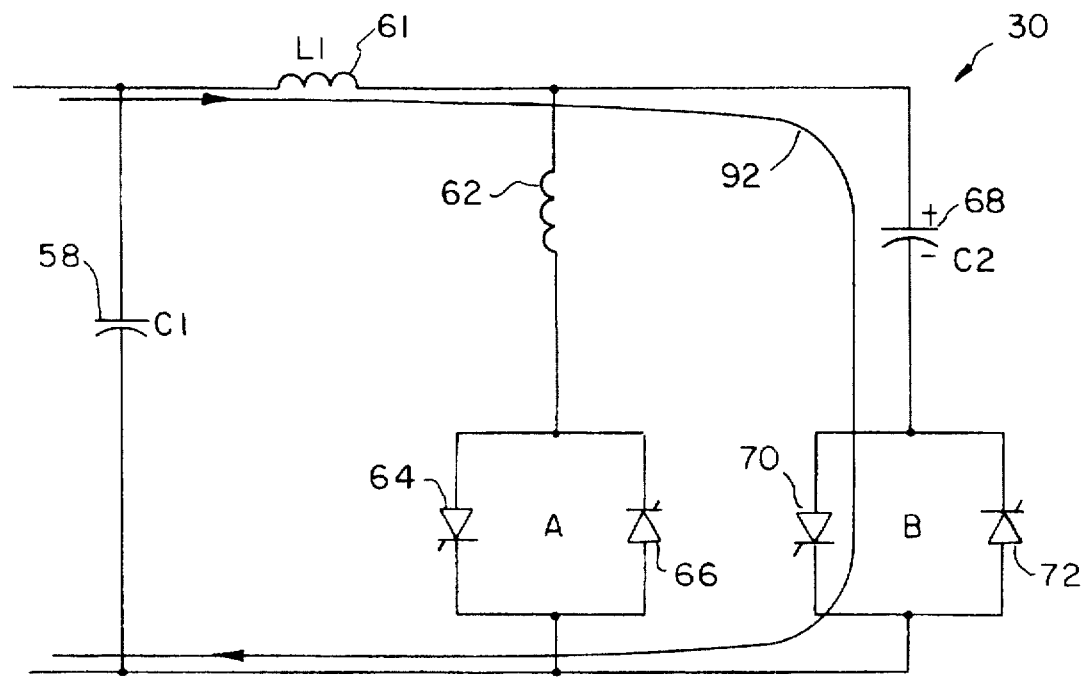
FIG. 6 is a schematic circuit diagram illustrating the flow of fault current through a storage capacitor of the DC blocking device immediately following the initiation of a fault.
Figure 7:
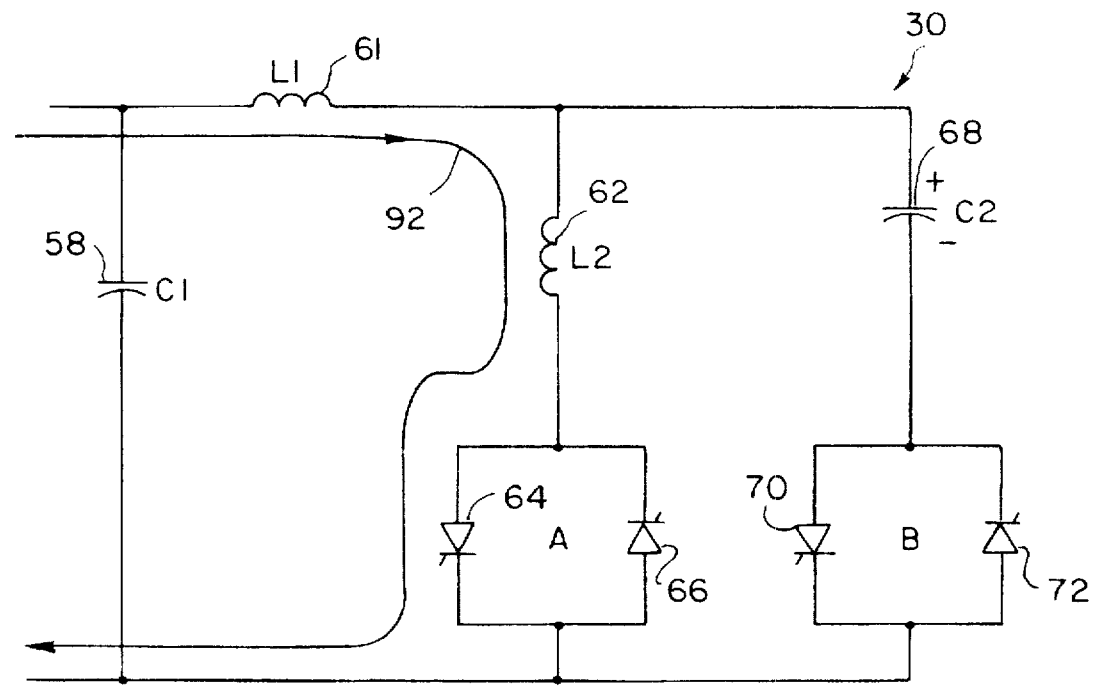
FIG. 7 is a schematic circuit diagram illustrating the flow of current through the main bypass path SCRs of the DC blocking device during a fault period.

At time $t_0$, an over current begins to occur. Shortly thereafter, at time $t_1$, the voltage across the blocking capacitor 58 reaches the predetermined trigger level. This is shown by the spike in the voltage waveform 91. At this point, the auxiliary SCRs 70 and 72 are turned on to capture a predetermined stored voltage level on storage capacitor 68. The flow of fault current 92 through the storage capacitor 68 and auxiliary SCRS, is shown in FIG. 6. However, this only occurs if the storage capacitor 68 does not already have the predetermined voltage charge level. If the storage-capacitor 68 is already sufficiently charged, the auxiliary SCRs 70 and 72 are not turned on to charge the capacitor, instead, the main SCRs 64 and 66 are turned on immediately after the trigger level is reached. If the auxiliary SCRs 70 and 72 are turned on, once the storage capacitor 68 reaches its stored voltage level, e.g., 50V, the main SCRs 64 and 66 are fired. This results in a low impedance bypass path between the terminals 54 and 56. The flow of fault current 92 is now through the inductor 62 and main bypass path SCRs 64 and 66 as shown in FIG. 7. Since the current to the auxiliary SCRs 70 and 72 is now shunted through main SCRs 64 and 66, the auxiliary SCRs, which are no longer receiving firing signals, are deprived of current and turn off, leaving the stored voltage captured on storage capacitor 68.

Figure 5:
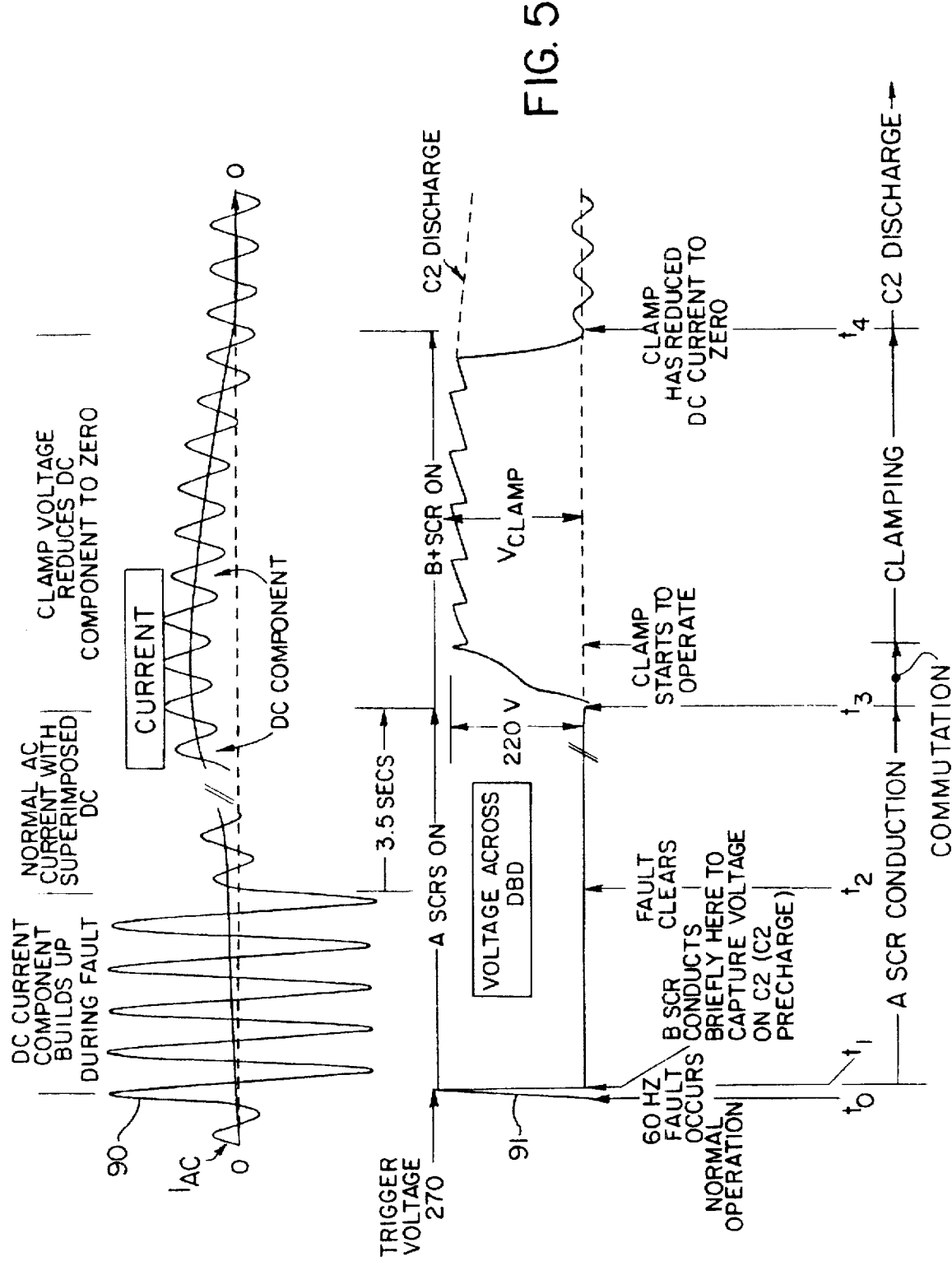
FIG. 5 is a waveform diagram illustrating the operating sequence of the DC blocking device of the present invention in response to an AC fault.
Figure 8:
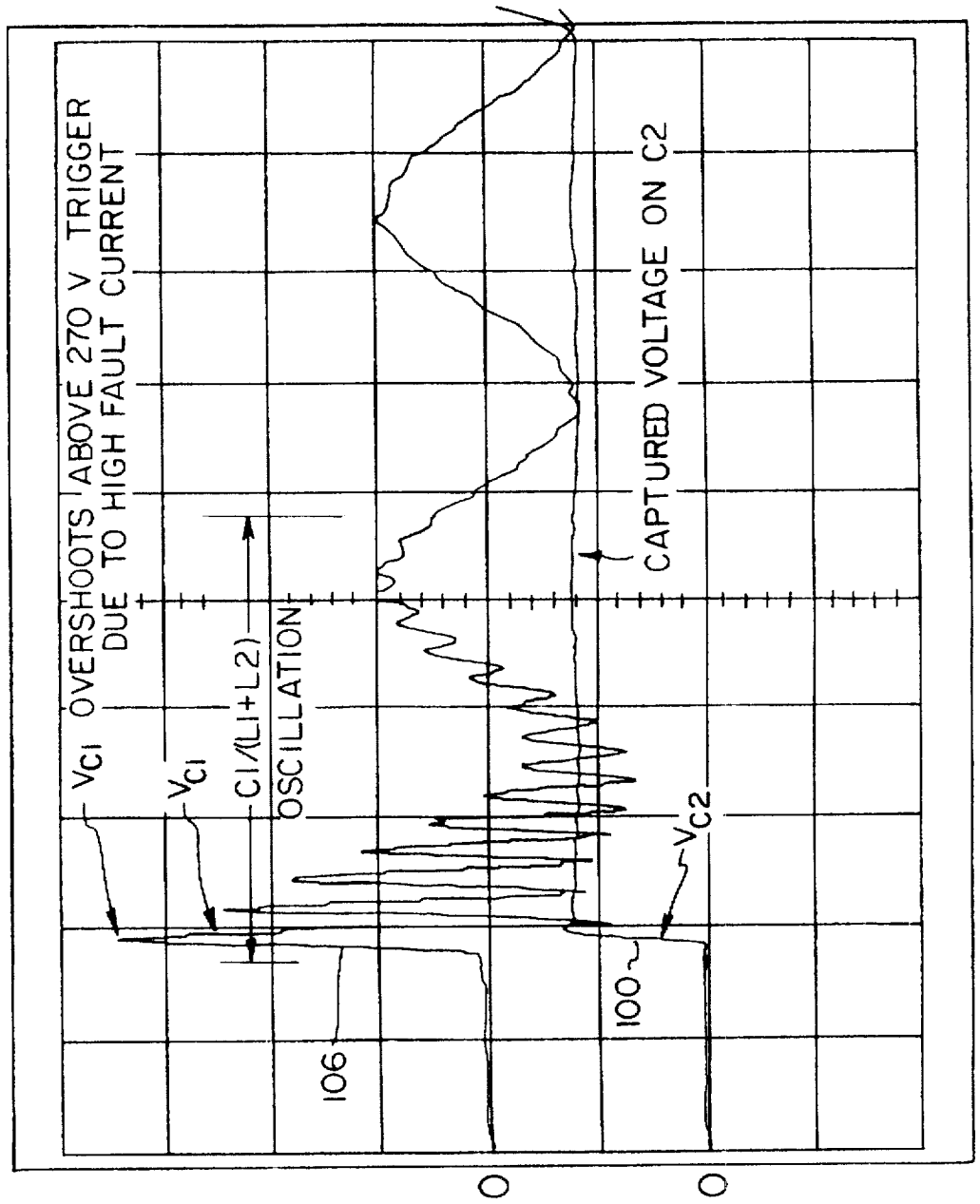
FIGS. 8–10 are waveform oscillograms illustrating voltages across the blocking and storage capacitors of the DC blocking device during the first two cycles of AC fault currents of various magnitudes.
Figure 9:
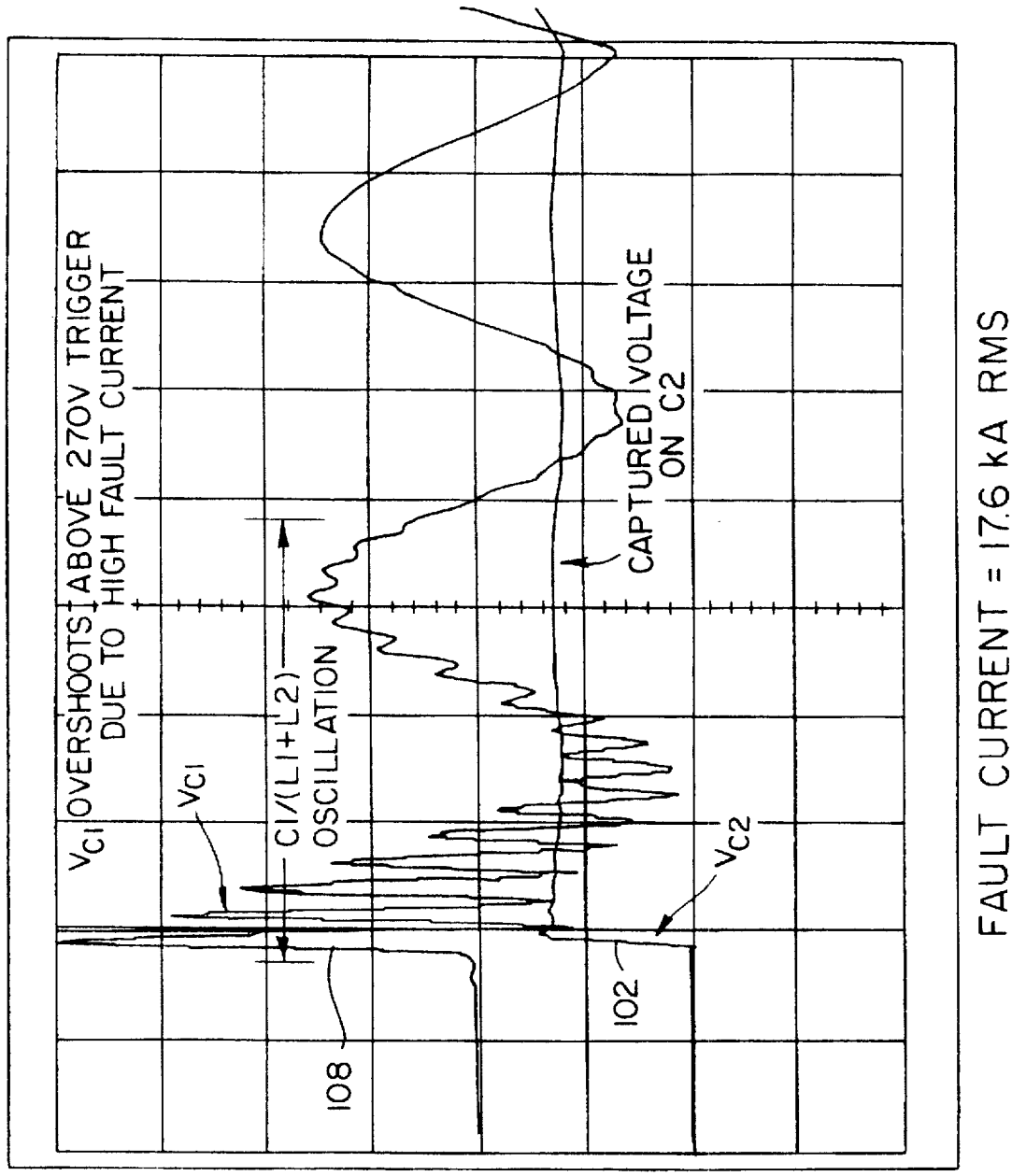
Figure 10:
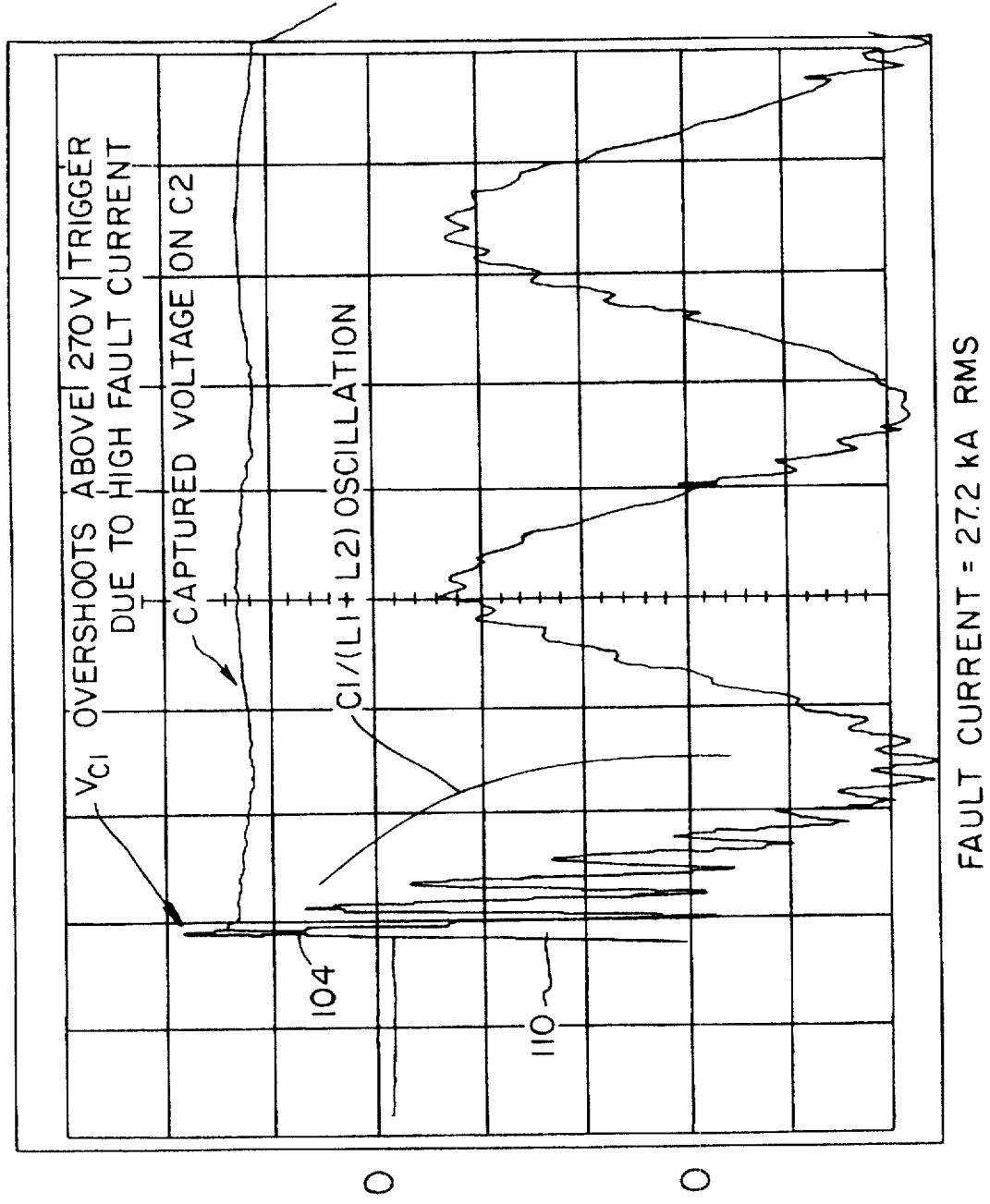

For simplicity, waveform details for the short initial conduction period of auxiliary SCRs 70 and 72 are not shown in FIG. 5. FIGS. 8–10 are actual oscillograms of the voltages across the blocking capacitor 58 and storage capacitor 68 during the first two cycles of AC fault currents of 11.6, 17.6, and 27.2 kA rms, respectively. Waveforms 100, 102, and 104 demonstrate the capture of voltage on the storage capacitor 68 at the triggering instant. Note that the storage capacitor 68 becomes quickly charged to the stored voltage level at the beginning of the fault. Waveforms 106, 108, and 110 illustrate that the voltage across the blocking capacitor 58 overshoots the triggering level, e.g., 270V, even after the main SCRs 64 and 66 are fired after the storage capacitor 68 reaches its stored voltage level. The level of the overshoot increases as the fault increases. This overshoot is caused by the inductance ($L_1+L_2$) of inductors 61 and 62 which does not allow instantaneous transfer of the fault current to the main SCRs 64 and 66 when they are triggered. Note, however, that the peak voltage across the SCRs 64 and 66 themselves, does not exceed the trigger level. This is because the SCRs are turned on at the trigger level, before the overshoot voltage on the blocking capacitor 58 occurs. As can be seen from waveforms 106, 108, and 110, the voltage across the blocking capacitor 58 will oscillate for a period after the SCRs 64 and 66 are triggered. This oscillation is caused by the $C_1/(L_1+L_2)$ resonant circuit formed by the blocking capacitor 58 and inductors 61 and 62.

Returning now to FIG. 5, during the fault period, the main SCRs 64 and 66 carry the fault current. The voltage across the blocking device, shown by waveform 91 remains low, and, for simplicity, may be assumed to be 0. At time $t_2$, the external fault clears. At this point, the main SCRs 64 and 66 are kept in conduction for a further "cooldown" period. The cooldown period allows the SCRs 64 and 66 time to cool before attempting to turn them off. The ability of an SCR to turn off and block reapplied voltage may be significantly degraded immediately after a current surge, due to the high SCR junction temperatures reached during the surge. After the cooldown period, and after the control system of the blocking device 30 checks to ensure that the fault has permanently cleared, the conditions are satisfied for turning off the main SCRs 64 and 66.

Due to the application of an external DC voltage across the terminals 54 and 56 of the blocking device 30, a DC component of current $I_{DC}$ will have built up in the main SCRs 64 and 66 during the fault and cooldown periods from time $t_1$, to time $t_3$. Thus, the forward conducting SCR 64 will be stuck in conduction with a uni-directional pulsating current, which is the sum of the DC current $I_{DC}$ and the normal AC current $I_{AC}$ passing through it.

At time $t_3$, the fault has passed, the cooldown period is completed and the window for keeping the main SCRs 64 and 66 in conduction is terminated. At this point, the DC current component $I_{DC}$ must be removed from the main SCR 64 in order to commutate it off to return the blocking device 30 to the DC current blocking state. Thus, at time $t_3$, the auxiliary SCRs 70 and 72 are fired. This causes the pre-captured voltage on storage capacitor 68 to divert the current from the main SCRs 64 and 66 into the auxiliary SCRs 70 and 72. This extinguishes the conduction of the main bypass path SCRs 64 and 66.

Figure 11:
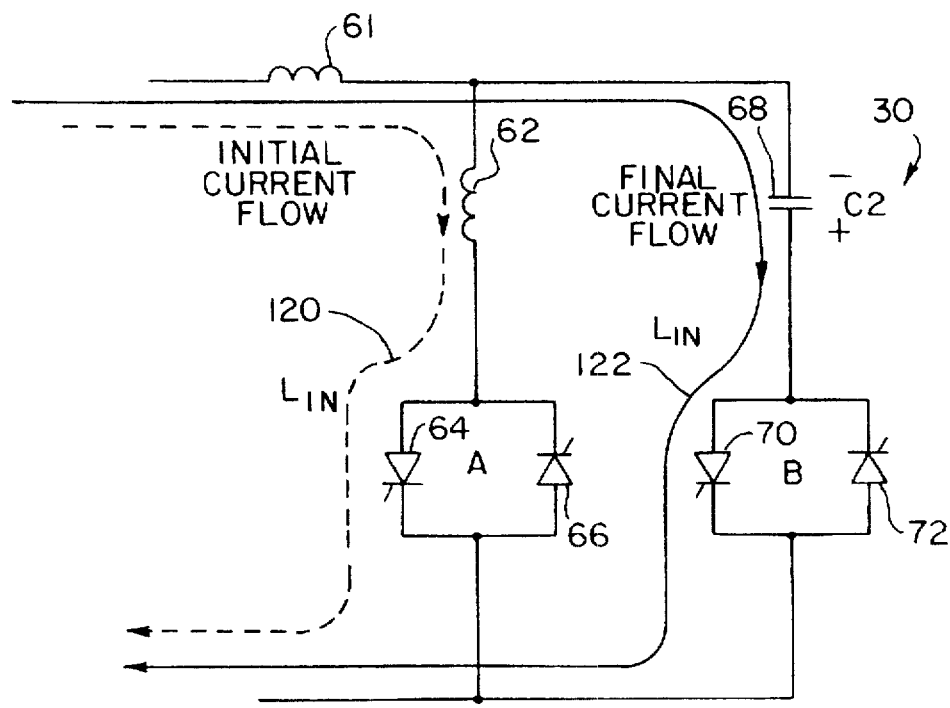
FIG. 11 is a schematic circuit diagram of a portion of the DC blocking device of the present invention, illustrating the commutation of DC current in the main SCRs of the DC blocking device when the storage capacitor is pre-charged negatively

FIG. 11 shows the initial and final current flows through the blocking device 30 for commutation off of the main SCR 64 in the case where the storage capacitor 68 was charged "negatively" during the initial charging period following the beginning of a fault. The storage capacitor 68 will become negatively charged when the initial fault condition voltage at terminal 54 is negative with respect to terminal 56. In this case, when the auxiliary SCRs 70 and 72 are fired, a reverse voltage from the storage capacitor 68 is impressed across the conducting main SCR 64, turning it off. The initial current flow 120 through the main bypass path is thus re-directed through the capacitor 68 and auxiliary SCR 70 to become the final current flow 122.

Figure 12:
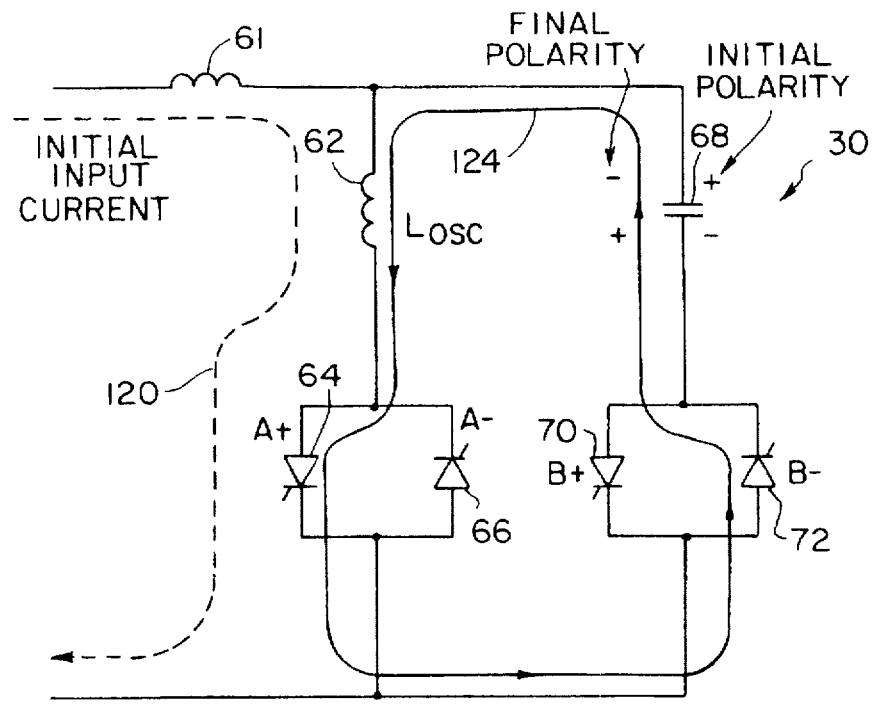
FIGS. 12–13 are schematic circuit diagrams of portions of the DC blocking device of the present invention, illustrating the commutation of DC current in the main bypass path SCRs of the blocking device when the storage capacitor is pre-charged positively.
Figure 13:
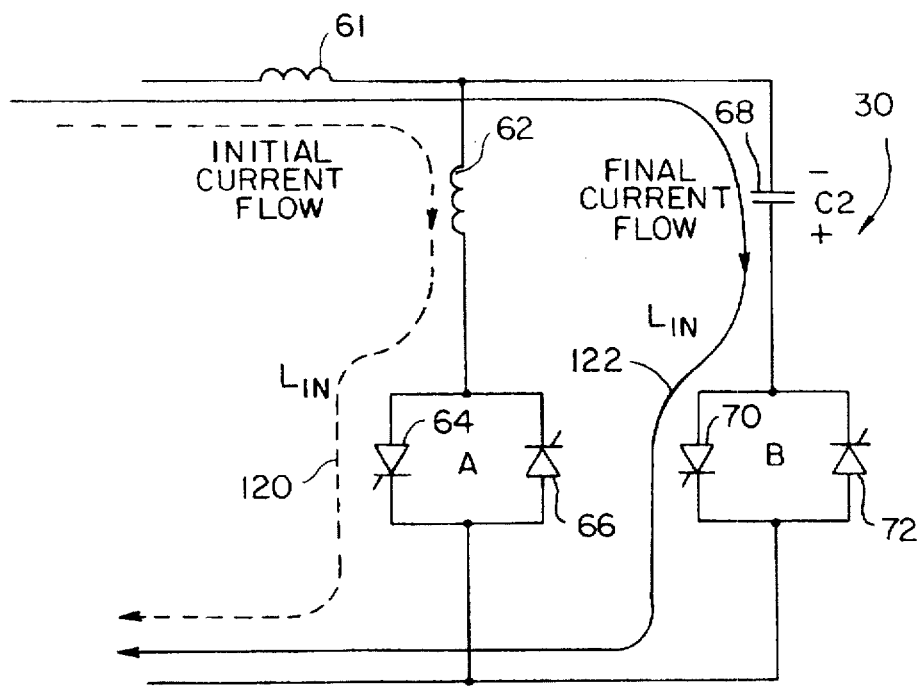

FIGS. 12 and 13 illustrate commutation of the forward conducting main SCR 64 in the case where the storage capacitor 68 has been pre-charged "positively" during the initial charging period following the initiation of a fault. The storage capacitor 68 may become positively charged, for example, when the initial fault voltage at terminal 54 is positive with respect to terminal 56. As shown in FIG. 12, the initial current 120 is flowing through the forward conducting main bypass path SCR 64. When the auxiliary SCRs 70 and 72 are fired, the stored voltage in the storage capacitor 68 sends a forward oscillatory current 124 through the forward main SCR 64, the backward conducting auxiliary SCR 72, and back into the storage capacitor 68. At the end of a half cycle of the oscillation, the voltage in the storage capacitor 68 has reversed. At this point, as shown in FIG. 13, the, now reversed, voltage across the storage capacitor 68 is impressed across the conducting main SCR 64 diverting the current 120 from the SCR 64 through the storage capacitor 68 and forward connected auxiliary SCR 70 resulting in the final current flow 122. Thus, the forward conducting main SCR 64 is commutated off. If the stored voltage on the storage capacitor 68 exceeds the predetermined stored voltage level, e.g., 50V, before the commutation process begins, the control system of the DC blocking device 30 waits until the storage capacitor 68 discharges to the predetermined stored voltage level before commencing commutation. This is done in order to avoid excessive amplitude on the oscillatory current 124.

It is also preferable that the commutation process be initiated only when the AC current in the blocking device is opposing the DC current in the device. This reduces the amount of current which must be removed from the main SCRs to turn them off.

During the fault and cooldown periods, time $t_1$ to time $t_3$, during which the main bypass path SCRs 64 and 66 are conducting, DC energy, from stray or applied DC voltage on the external system to which the DC blocking device 30 is attached, may become stored in the system inductances $L_{SYS}$ of the external system. For example, such DC energy may become stored on the windings 38 of the transformer 32 to which the DC blocking device 30 is attached, as shown in FIG. 1. The DC energy stored in this case will be: $\frac{1}{2}L_{SYS}I_{DC}^2$. (DC energy can similarly become stored in the inductances 61 and 62 of the blocking device 30 itself.) This stored DC energy causes the voltage across the blocking device 30 to rise once the main bypass path SCRs 64 and 66 have been turned off. The voltage rise may result in false re-triggering of a fault handling sequence by the blocking device 30. Thus, the stored energy can cause continuous cycling into and out of fault operations. The current in the system inductances may also be forced through the inductor 61, the storage capacitor 68 and the forward connected auxiliary SCR 70, preventing timely turn-off of the SCR 70. Some current will also flow in the blocking capacitor 58.

Figure 14:
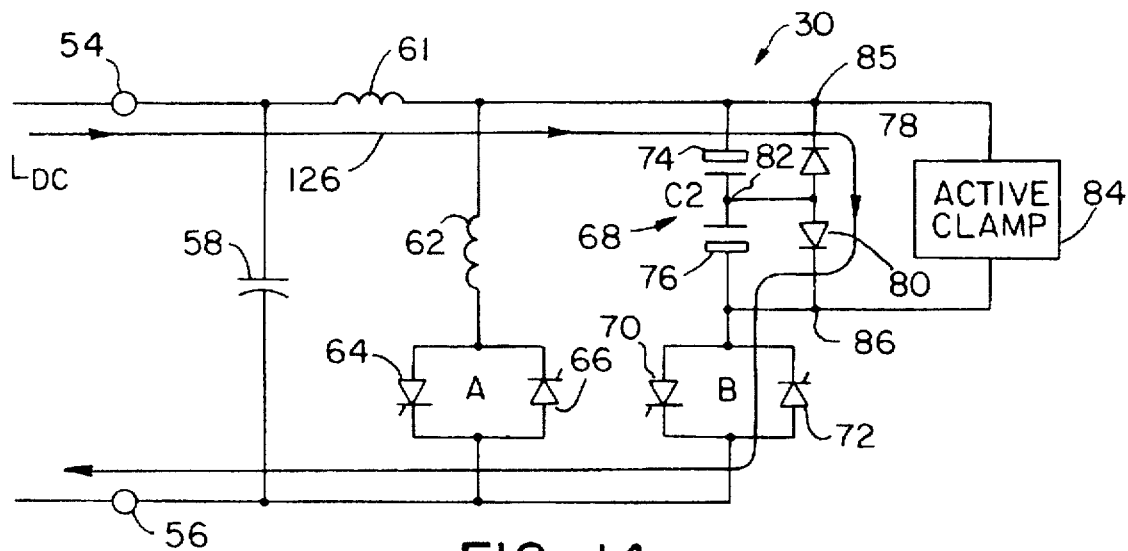
FIG. 14 is a schematic circuit diagram illustrating the flow of DC current through a voltage clamp to dissipate stored system energy following a fault period.

To deal with these potential problems, a clamp circuit 84 is preferably provided. When the stored DC energy causes the voltage across the clamp circuit 84 to reach a certain level, the clamp circuit 84 prevents a further rise in the voltage beyond this clamping level. As shown in FIG. 14, the current flow 126 is directed through the voltage clamp 84 and the forward conducting auxiliary SCR 70 during the clamping period. The active voltage clamp 84 bypasses the current 126 into a resistor, which dissipates the stored system energy. The voltage across the clamp 84, $V_{CLAMP}$, is much higher than the external applied or stray DC fault voltage. Since the system inductance $L_{SYS}$ is typically much higher than the inductance of inductors 61 and 62, $L_1+L_2$, the stored DC current will be effectively decreased by the clamp 84 at a rate of $V_{CLAMP}/L_{SYS}$ amps/s.

Figure 15:
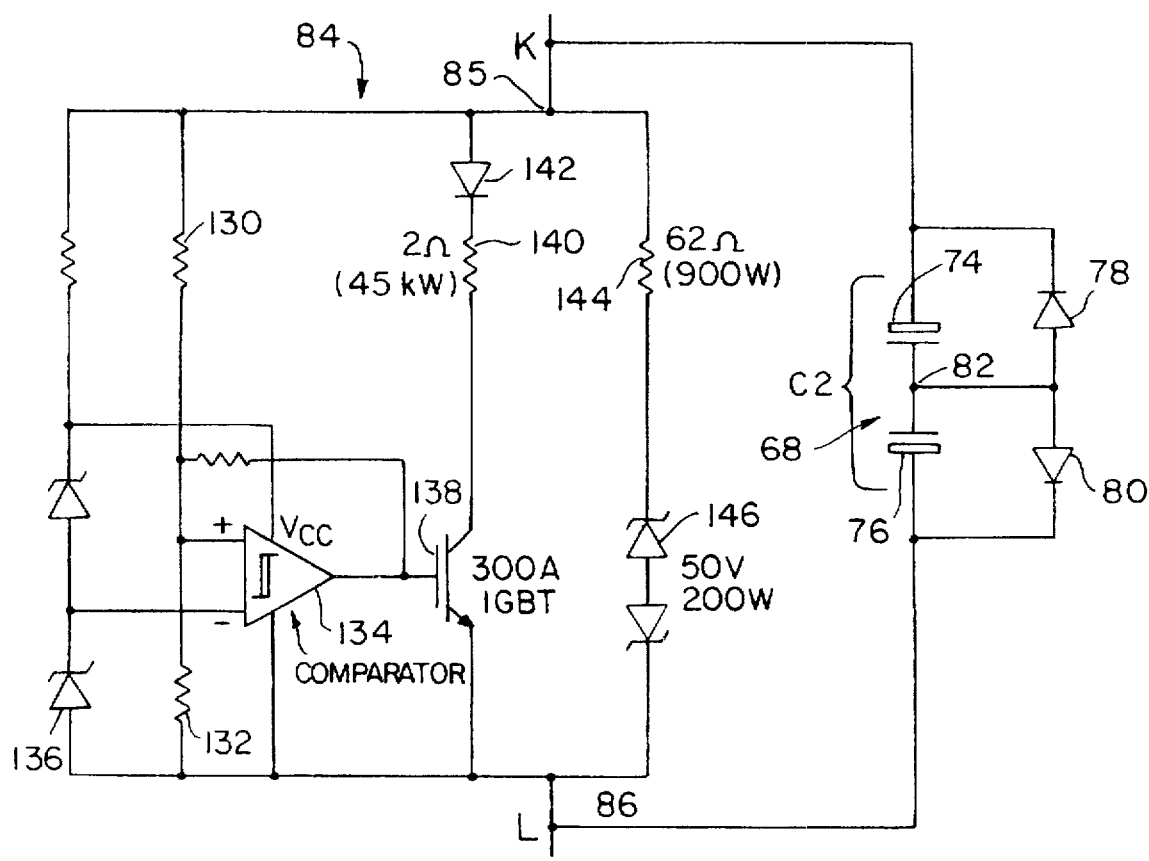
FIG. 15 is a schematic circuit diagram of a voltage clamp circuit for the DC blocking device of the present invention.

The active voltage clamp 84 is described in more detail with reference to the schematic circuit diagram of FIG. 15. Resistors 130 and 132 form a voltage divider across the terminals 85 and 86 of the clamp 84. The values of the resistors 130 and 132 are selected such that when the voltage across the clamp terminals 85 and 86 is less than the clamping voltage level, e.g., 220V, a voltage level is applied to the positive terminal of a comparator 134 which is less than the voltage applied to the negative terminal of the comparator 134 as set by the zener diode 136. Thus, when the voltage across the terminals 85 and 86 is less than the clamp voltage level, the output of the comparator 134 is approximately 0 volts. The output of the comparator 134 is connected to the gate of a switching device, such as a insulated gate bipolar transistor (IGBT) 138. A low input voltage on the gate of the transistor 138 ensures that the transistor 138 will be turned off, and will not be conducting any current.

When the voltage across the clamp terminals 85 and 86 exceeds the clamp voltage level, during the clamping period, the voltage on the positive input of the comparator 134 exceeds the voltage on the negative input of the comparator 134 and the output of the comparator becomes HIGH. This turns on the transistor 138, connecting resistor 140 in series with diode 142 across the terminals 85 and 86. Current is thus conducted through, and dissipated by, the resistor 140. Hysteresis in the comparator 134 keeps the transistor 138 on until the voltage across the terminals 85 and 86 falls below a lower clamping level, e.g., 180V.

Figure 16:
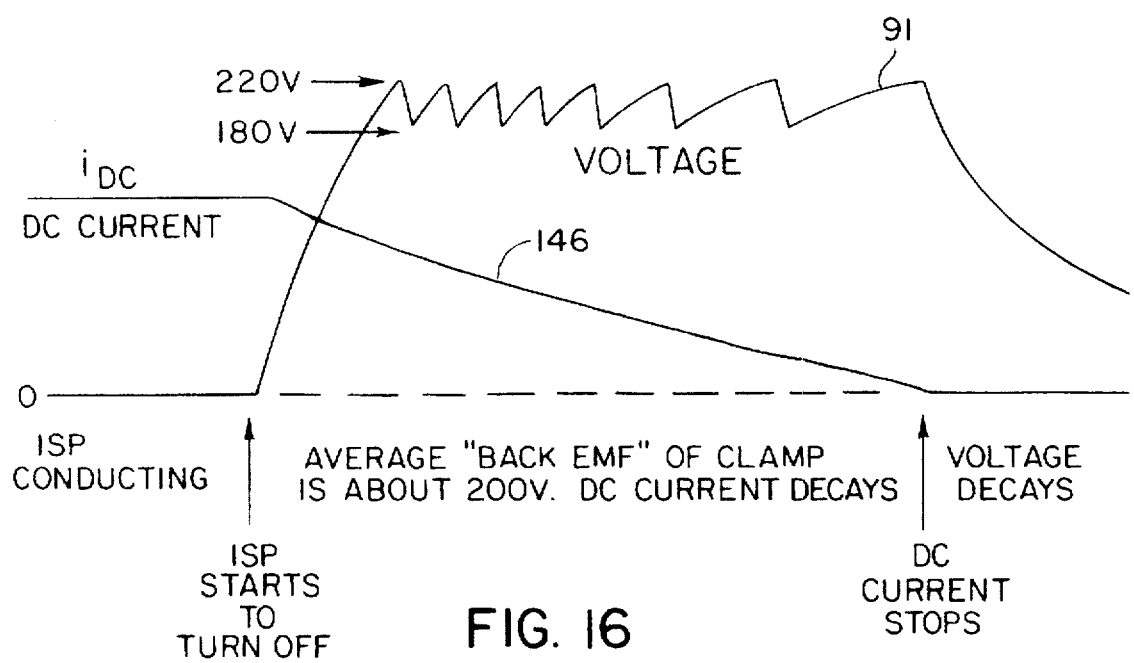
FIG. 16 is a waveform diagram illustrating the operation of the voltage clamp circuit of FIG. 15.

As shown by the waveforms of FIG. 16, the storage capacitor 68 acts in concert with the active clamp circuit 84 to produce a voltage waveform 91 across the blocking device 30 that sawtooths between the upper clamp voltage level, 220V, and the lower clamp voltage level, 180V. Thus, the storage capacitor 68 has a dual role. It is used to commutate current from the main SCRs 64 and 66 to turn them off after a fault period, as well as serving as an integral part of the clamp circuit 84. It can be seen that the active clamp 84, as shown, has an effective constant average clamp voltage value of 200V, the average of 180V and 220V. This clamp voltage level is independent of the value of the DC current, $I_{DC}$. Maintaining the clamp voltage at a constant average value of the current is desirable as this minimizes the fall time of the DC current as shown by waveform 146 in FIG. 16.

The clamp circuit 84 shown in FIG. 14 is unidirectional, i.e., only positively oriented voltages will be clamped, and positively directed currents will be dissipated. For various applications, a bi-directional clamp may be preferred. Such a bi-directional clamping circuit may be implemented using two clamp circuits 84 as shown in FIG. 14 connected in anti-parallel. Alternatively, a single unidirectional clamp circuit 84 can be used in combination with a full wave bridge rectifier circuit. The resulting bi-directional clamping circuit will dissipate inductive currents flowing in either direction through the blocking device 30.

The purpose of the resistor 144 and zener diode 146 is to discharge slowly excess voltage across the storage capacitor 68 after the clamp period has finished. The breakdown voltage of the zener diode 146 is set to equal the desired stored voltage level in the capacitor 68. Thus, when the voltage across the capacitor 68 exceeds this level, the zener diode 146 will conduct current through the resistor 144 which will dissipate the excess energy. The resistor 144 and zener diode 146 also act to remove excess voltage on the storage on the capacity the voltage captured on the capacitor 68 during initial triggering of the blocking device 30 overshoots to a level higher than the predetermined stored voltage level.

Returning once again to FIG. 5, at time $t_4$ the DC component of the current through the blocking device 30 reaches 0. Thus, all the DC energy stored in the system inductances has been removed. The forward conducting auxiliary SCR 70 turns off naturally, since it now has become deprived of current. The residual AC system current, $I_{AC}$, diverts in its entirety from the auxiliary bypass path to the DC blocking capacitor 58. The voltage across the blocking device 30 returns to its normal value. The storage capacitor 68 initially remains charged to the clamping level $V_{CLAMP}$, but is slowly discharged to the residual voltage storage level by action of the resistor 144 and zener diode 146. Operation of the blocking device 30 then returns to its original pre-fault state, i.e., before time $t_0$.

A preferred embodiment of a control system 150 for the DC blocking device 30 of the present invention is described with reference to FIG. 17. Though shown implemented with discrete logic components, the control system 150 for the blocking device 30 may also be implemented using, for example, programmable logic devices. The control logic system for the blocking device 30 may also be implemented, in whole or in part, using a software programmable microprocessor or similar device.

Power for the logic and firing circuits of the control system 150 may preferably be provided by an independent power supply (not shown). Alternatively, power for the control system may be provided by the fault currents themselves. Therefore, since power for commutation of the main SCRs 64 and 66 is also provided by the fault current, as stored in storage capacitor 68, the entire blocking device of the present invention 30 may be made autonomous, i.e., without the need for any auxiliary power supply. An autonomous blocking device 30 is particularly suitable to applications in remote locations. In an autonomous blocking device 30, the control system 150 may be powered during the initial period following the initiation of a fault from energy stored in the main blocking capacitor 58. Once the storage capacitor 68, which is much larger than the blocking capacitor 58, is fully charged by the fault current, power for the control system 150 may be obtained from the energy stored in the storage capacitor 68. The energy stored in the storage capacitor 68 will typically be sufficient both to power the control system 150 through the fault handling period and to commutate off the main SCRs 64 and 66 after the fault has passed.

The control logic circuit 150 includes monostable timing circuits 152, 154 and 156. In normal operation, monostables 152, 154 and 156 have a logic 1 input and a corresponding logic 0 output. When the input is driven to logic 0, the output becomes logic 1. The output remains at logic 1 until a set time after the input returns to logic 1, at which time the output returns to logic 0.

Monostable timing circuits 158, 160, 162, 164, 166 and 167 also have a logic 1 input and corresponding logic 0 output in normal operation. When the input of these monostables is driven to logic 0, the output becomes logic 1. The output remains at logic 1 for a set time after the input first becomes logic 0. The output then returns to logic 0 until the next transition of the input from logic 1 to logic 0.

Voltage sensing circuit 168 has a logic 1 output when the voltage across the DC blocking capacitor 58 exceeds the fault trigger level, e.g., 270V. The voltage sensing circuit 168 has a logic 0 output when the voltage across the DC blocking capacitor 58 is less than the fault trigger level.

Voltage sensing circuit 170 has a logic 1 output at terminal A, and a logic 0 output at terminal /A, when the voltage across the storage capacitor 68 is greater than the predetermined stored voltage level, e.g., 50V. When the voltage across the storage capacitor 68 is less than the stored voltage level, the /A output of voltage sensing circuit 170 is logic 1, and the output A of voltage sensing circuit 170 is logic 0.

The voltage sensing circuit 172 has a logic 1 output when the voltage across the main bypass path SCRs 64 and 66 is greater than a re-triggering level, e.g., 20V. Voltage sensing circuit 172 has a logic 0 output when the voltage across the main bypass path SCRs 64 and 66 is less than the re-triggering level.

The voltage sensing circuit 174 has a logic 1 output when the voltage across the forward conducting auxiliary SCR 70 is greater than a set level, e.g., 5V. Voltage sensing circuit 174 has a logic 0 output when the voltage across the forward conducting auxiliary SCR 70 is less than the set level.

Current sensing circuit 176 has a logic 1 output when the system AC current through the blocking device 30 is greater than the maximum normal value, e.g., 120 AC rms. Current sensing circuit 176 has a logic 0 output when the system AC current is less than or equal to the maximum normal value.

Current sensing circuit 178 delivers a logic 1 output when the AC current through the blocking device 30 is instantaneously positive, i.e., current is flowing into the blocking device 30 through terminal 54 and out of the blocking device 30 through terminal 56. The current sensing circuit 178 has a logic 0 output when the AC current through the DC blocking device 30 is instantaneously negative.

Each of the voltage sensing circuits 168, 170, 172 and 174 and current sensing circuits 176, and 178 may be implemented as conventional voltage and current sensing circuits which are known to those having skill in the art.

SCR firing circuits 180, 182, and 184, deliver isolated firing pulses to the backward conducting auxiliary SCR 72, the forward conducting auxiliary SCR 70, and the main bypass path SCRs 64 and 66, respectively. The firing circuits 180, 182 and 184 deliver isolated firing pulses at their outputs to their respective SCRs in response to logic 1 signals at their inputs. The firing circuits 180, 182, and 184 may be of a conventional design.

During normal operation, i.e., not during or just after a fault condition, the outputs of the monostables 160, 162, 166 and 167 are logic 0. Thus, the inputs to the firing circuits 180, 182 and 184 are logic 0, and no firing pulses are delivered to the SCRs 64, 66, 70, and 72. During normal operation, the voltage $V_{C1}$ across the blocking capacitor 58 is less than the fault triggering level, therefore, the output of voltage sensing circuit 168 is logic 0. The outputs of the other monostable circuits 152, 154, 156, 158, and 164 are also at logic 0.

When a fault occurs that increases the voltage level across the blocking capacitor 58 to the triggering level, the output of voltage sensing circuit 168 becomes logic 1. The output of voltage sensing circuit 168 is passed through inverter 188, appearing as a logic 0 input to monostable circuit 158. Thus, the output of monostable circuit 158 becomes logic 1. If the voltage $V_{C2}$ across the storage capacitor 68 is less than the predetermined stored voltage level, e.g., 50V, the output /A of voltage sensing circuit 170 will be logic 1, making all the inputs to the AND gate 190 logic 1. (Recall that the output of monostable 152 is logic 0 during normal operation, which signal is inverted by inverter 191.) The output of the AND gate 190, will thus become logic 1, causing differentiator circuit 192 to generate a positive going pulse which is inverted by inverter 194. This causes the input to the monostable circuit 160 to be driven to logic 0 for a period determined by the differentiator 192. The output of monostable circuit 160 therefore becomes logic 1, for, e.g., 10 microseconds. This pulse is delivered to the OR gates 196 and 198. The logic 1 on the OR gates 196 and 198 causes a firing pulse to be delivered via firing circuits 180 and 182 to the auxiliary bypass path SCRs 72 and 70, respectively. Note that while the output of monostable circuit 160 is at logic 1, the output of the inverter 200 is logic 0. This prevents a logic 0 from appearing at the output of NAND gate 202, and at the input of monostable circuit 167. Thus, monostable circuit 167 is positively prevented from initiating a firing pulse from firing circuit 184 to the main bypass path SCRs 64 and 66 while the auxiliary bypass path SCRs 70 and 72 are being fired.

As soon as the storage capacitor 68 charges to the stored voltage level, the output /A of voltage sensing circuit 170 becomes logic 0. Shortly thereafter, the output A of voltage sensing circuit 170 becomes logic 1. The outputs of voltage sensing circuit 170 do not change simultaneously in order to provide a short deadband to ensure that the main SCRs 64 and 66 and auxiliary SCRs 70 and 72 are not fired simultaneously. At this point, the output of monostable circuit 158 is still logic 1. Thus, the output of AND gate 204 becomes logic 1. This causes the output of NOR gate 206 and the input to monostable circuit 152 to become logic 0. This causes the output of monostable circuit 152 to become logic 1, the output of NOR gate 208 to become logic 0, and the output of inverter 210 to become logic 1. At this point, the output of the inverter 200 is also logic 1 as is the output of voltage sensing circuit 172, since the instantaneous voltage across the main bypass path SCRs 64 and 66 is the fault voltage level, which is greater than the pre-set re-triggering level, e.g., 20 V. Thus, the output of NAND gate 202 become logic 0, causing monostable circuit 167 to deliver a logic 1 input pulse to the SCR firing circuit 184. In turn, the firing circuit 184 causes firing pulses to be delivered to the main bypass path SCRs 64 and 66.

Figure 18:
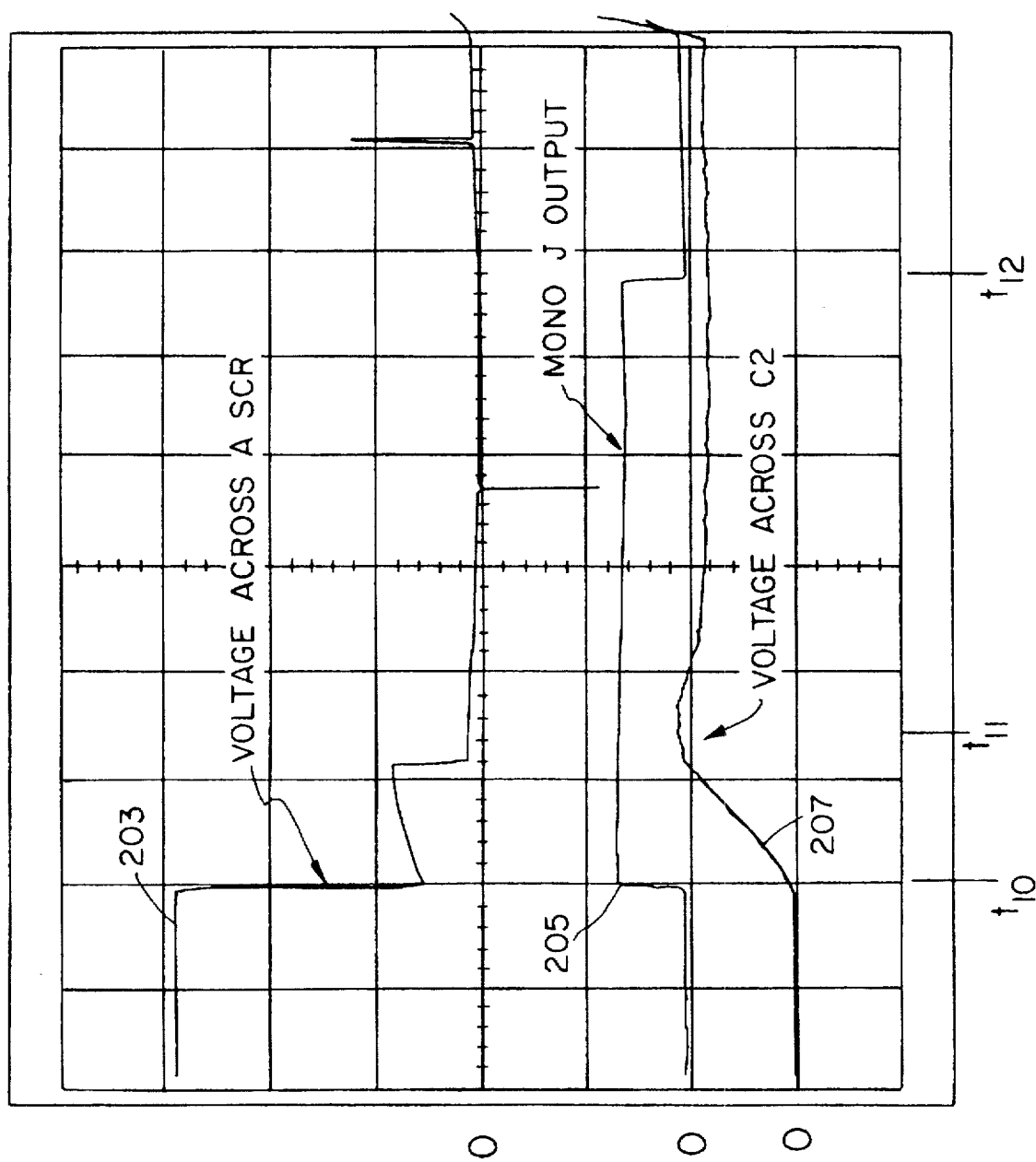
FIG. 18 is a waveform oscillogram illustrating the capture of voltage across a storage capacitor in response to a control signal generated by the control circuit of FIG. 17.

Waveforms illustrating the relationship between the voltage across the main bypass path SCRs 64 and 66 (waveform 203), the output signal from the monostable circuit 158 (waveform 205), and the voltage across the storage capacitor 68 (waveform 207), are shown in FIG. 18. At time $t_{10}$ the output of monostable 158 goes to logic 1, initiating triggering of the auxiliary SCRs 70 and 72. This connects the storage capacitor 68 across the inputs of the blocking device 30 via the inductor 61, causing the capacitor 68 to begin the charge from the fault current. Since the fault current is now flowing through the auxiliary bypass path, the voltage across the main SCRs 64 and 66 immediately drops, then begins to increase with the voltage across capacitor 68. At time $t_{11}$ the voltage on capacitor 68 has reached the stored voltage level. Thus, the main SCRs 64 and 66 are turned on, which causes the auxiliary SCRs 70 and 72 to be turned off, stopping the voltage rise on capacitor 68 when the main SCRs 64 and 66 are turned on, the voltage across them drops to zero. At $t_{12}$, after the predetermined delay of the monostable circuit 158, the output of monostable 158 returns to logic 0.

The pre-determined delay of monostable 158 is more than sufficient to allow the voltage on the storage capacitor 68 to reach the stored voltage level, resulting in a change in the outputs of voltage sensing circuit 170 which, in turn, initiates firing of the main SCRs 64 and 66. If the storage capacitor 68 fails to charge, or the voltage sensing circuit 170 fails to indicate that the storage capacitor 68 is charged to the stored voltage level, the return of the output of monostable 158 to logic 0 will cause differentiator 209 to output a negative going pulse which is inverted by inverter 211. The positive pulse output of inverter 211 activates NOR gate 206, initiating firing of the main SCRs 64 and 66. Thus, the delay of monostable 158 determines the maximum allowed time for voltage sensing circuit 170 to indicate that the storage capacitor 68 has been charged to the stored voltage level. If the output of voltage sensing circuit 170 does not change within the allowed time, a failure is assumed, and the return of the output of monostable 158 to logic zero initiates firing of the main SCRs 64 and 66 to provide a low impedance path across the blocking device 30. Thus, a failure of the voltage sensing circuit 170, for example, will not result in a failure of the blocking device to pass fault current through the main bypass path.

When the main bypass path SCRs 64 and 66 fire, the voltage across them falls below the firing voltage level. Thus, the output of voltage sensing circuit 172 becomes logic 0. This causes the output of NAND gate 202 to become logic 1, and prevents further firing pulses from being delivered by the firing circuit 184 as long as the voltage across the main bypass path SCRs 64 and 66 remains less than the re-triggering voltage of 20 V.

So long as the fault condition remains, the output of monostable circuit 152 remains at logic 1. This causes the output of inverter 210 to also remain at logic 1. Moreover, the output of inverter 200 remains at logic 1 through the fault because the output of the monostable 152 is inverted by inverter 191 to assure that the output of AND gate 190 remains at logic 0, preventing firing of the auxiliary SCRs 70 and 72 via monostable circuit 160. Thus, a window for firing of the main bypass path SCRs 64 and 66 is maintained. New firing pulses are delivered to the main bypass path SCRs 64 and 66 each time that the current through the main bypass path falls to 0 and tries to reverse. When the AC fault current through the SCRs 64 and 66 falls to 0, the SCRs commutate off. Thus, when the current reverses on the opposite half of the cycle, the voltage across the SCRs 64 and 66 rapidly increases to the re-triggering level set by the voltage sensing circuit 172. This causes the NAND gate 202 to produce a logic 0 output. In turn, monostable circuit 167 initiates a new firing pulse to the main SCRs 64 and 66 through the firing circuit 184.

Therefore, after the initial firing of the main bypass path SCRs 64 and 66 at the fault triggering level, 270V, the bypass path SCRs 64 and 66 are fired each time that their anode voltage exceeds the re-triggering voltage level, 20V. Holding back firing until the voltage reaches 20V ensures that all parallel bypass path SCRs, as shown in FIG. 4, are fired, even at moderate levels of fault current. A side effect of the 20V firing threshold is that it creates a local oscillatory current, of about 300 amps peak, through the inductors 61 and 62. If the external fault current is low, this local oscillatory current can periodically reduce the net current through the SCRs 64 and 66 to 0, thereby naturally turning off the main SCRs 64 and 66 after about 1.5 ms. Re-triggering will occur, however, when the instantaneous voltage again exceeds the re-triggering level 20V. If the externally applied fault current is more than a few hundred amps, the main SCRs 64 and 66 will stay in conduction for the full 60 Hz half cycle of the fault current. This is because the oscillatory current produced by the 20 V firing threshold in such a case will not be sufficient to periodically reduce the current through the SCRs 64 and 66 to zero, therefore, they will remain in conduction.

The output of monostable circuit 152 is fed as an input to the AND gate 212. The other input to AND gate 212 is the output of OR gate 214. Thus, once the output of monostable circuit 152 becomes logic 1, it stays at logic 1 so long as the output of OR gate 214 is logic 1. This is because a logic 1 output on OR gate 214 results in a logic 1 output on AND gate 212 and a logic 0 output on NOR gate 206 which keeps the output of monostable 152 at logic 1. The output of OR gate 214 is logic 1 so long as the AC current through the blocking device 30 is greater than normal, the voltage $V_{C2}$ across the storage capacitor 68 is greater than the pre-determined stored voltage value, or both. So long as the AC current in the blocking device 30 is greater than the normal value, the output of current sensor 176 is logic 1. Also, as described earlier, so long as the voltage across the storage capacitor 68 is greater than the pre-determined stored voltage value, the A output of voltage sensing circuit 170 is logic 1. Thus, the output of monostable 152 is kept at logic 1, and the firing window for the main bypass path SCRs 64 and 66 is maintained, until the AC current has returned to normal and any excess voltage above the stored voltage level on storage capacitor 68 has been dissipated. The first condition, requiring a return to normal AC current, ensures that the cooldown period for the main SCRs 64 and 66, as set by monostable 152, is started only after the fault has cleared. The second condition, requiring no excess voltage on storage capacitor 68, is necessary to avoid excessive current from the storage capacitor 68 when firing the auxiliary SCRs 70 and 72 to commutate off the main SCRs 64 and 66.

Once these two conditions have been met, the output of AND gate 212 goes to logic 0, the output of NOR gate 206 goes to logic 1, the input to monostable circuit 152 goes to logic 1, and a cooldown period, e.g. of 2.5 seconds, is initiated. The duration of the cooldown period is set by the monostable circuit 152. The output of the monostable circuit 152 goes to logic 0 after the cooldown period. This sets the stage for termination of the firing window for the main bypass path SCRs 64 and 66.

The output of monostable circuit 154 is connected via AND gate 216 as an input to NOR gate 208. The other input to the AND gate 216 is the output of the current sensing circuit 178, which provides a logic 1 signal when the current through the blocking device 30 is positive. Thus, when the output of monostable circuit 152 goes to logic 0, the input to monostable circuit 154 goes to logic 1 if the output of the current sensing circuit 178 is logic 0 at the same time. Otherwise, the input to the monostable circuit 154 goes to logic 1 as soon as the output of current sensing circuit 178 goes to logic 0. This will occur as soon as the next negative half cycle of the current through the blocking device 30 begins. Since the output of monostable circuit 154 going to logic 0 controls the initiation of turn-off of the main bypass path SCRs 64 and 66, the requirement for the output of the current sensing circuit 178 to be logic 0 before turn-off is initiated assures that the commutation of current in the main bypass path SCRs 64 and 66 cannot take place during a positive half cycle of the AC system current when the AC current would be in addition to any DC current through SCRs 64 and 66.

The output of monostable circuit 154 going to logic 0 controls the initiation of firing pulses to the auxiliary SCRs 70 and 72. The built in delay of the monostable circuit 154, e.g., 1.3 ms, assures that the output of the circuit 154 won't go to 0 for a period after the firing window for the main SCRs 64 and 66 is terminated by the output of monostable circuit 152 going to logic 0. During this delay period, the main SCRs 64 and 66 are left without firing pulses. This ensures that no firing pulses for the main SCRs 64 and 66 are present when the auxiliary SCRs 70 and 72 are fired. This, in turn, avoids the possibility for high internal circulating current and commutation failure.

When the output of monostable circuit 154 goes to logic 0, the input to monostable circuit 156 goes to logic 1 through action of the inverter 218. A set time later, the output of monostable circuit 156 goes to 0. (Note that monostable 156 merely adds an extra delay which may be eliminated.) This causes the output of the differentiator 220 to deliver a logic 0 pulse to the inputs of monostable circuits 162 and 164. This causes the output of monostable circuit 162 to become logic 1 for 20 microseconds, causing a 20 microsecond firing pulse to be delivered to the backward conducting auxiliary SCR 72 by firing circuit 180.

Simultaneously, the output of monostable circuit 164 becomes logic 1 for a set period, e.g., between about 2 and 7 seconds. During this period, the forward connected auxiliary SCR 70 is free to conduct. This allows for connection of the voltage clamp circuit 84 into the DC blocking device 30. Preferably, this voltage clamping period is adjustable.

providing flexibility for optimization of the clamping period to suit the particular external system parameters. Throughout the period that the monostable circuit 164 has a logic 1 output, the output of the NAND gate 222 will be driven to logic 0 by the voltage sensing circuit 174 which produces a logic 1 output when the voltage across the forward conducting auxiliary SCR 70 exceeds a selected voltage level, e.g., 5V. When the output of NAND gate 222 goes to logic 0, the output of monostable circuit 166 initiates a 20 μs firing pulse to be delivered to the forward conducting auxiliary SCR 70 by the firing circuit 182. Thus, a 20 μs firing pulse is delivered to the forward conducting auxiliary SCR 70 whenever the voltage across it exceeds 5 V. This ensures that the forward conducting auxiliary SCR 70 keeps the clamp circuit 84 connected throughout the clamp period whenever positive current wants to flow into the clamp circuit. If a bi-directional clamping circuit is employed, a similar mechanism may be used to fire the backward connected auxiliary SCR 72 to keep the clamp circuit connected through the clamp period whenever either positive or negative current wants to flow in the clamp circuit.

When the output of monostable circuit 164 goes to logic 0, the output of NAND gate 222 is disenabled. Thus, further firing of the forward conducting auxiliary SCR 70 is prevented, disconnecting the voltage clamp 84 from the blocking device 30. At this point the state of the control system circuit 150 returns to its state prior to the initiation of the fault.

Figure 17B:
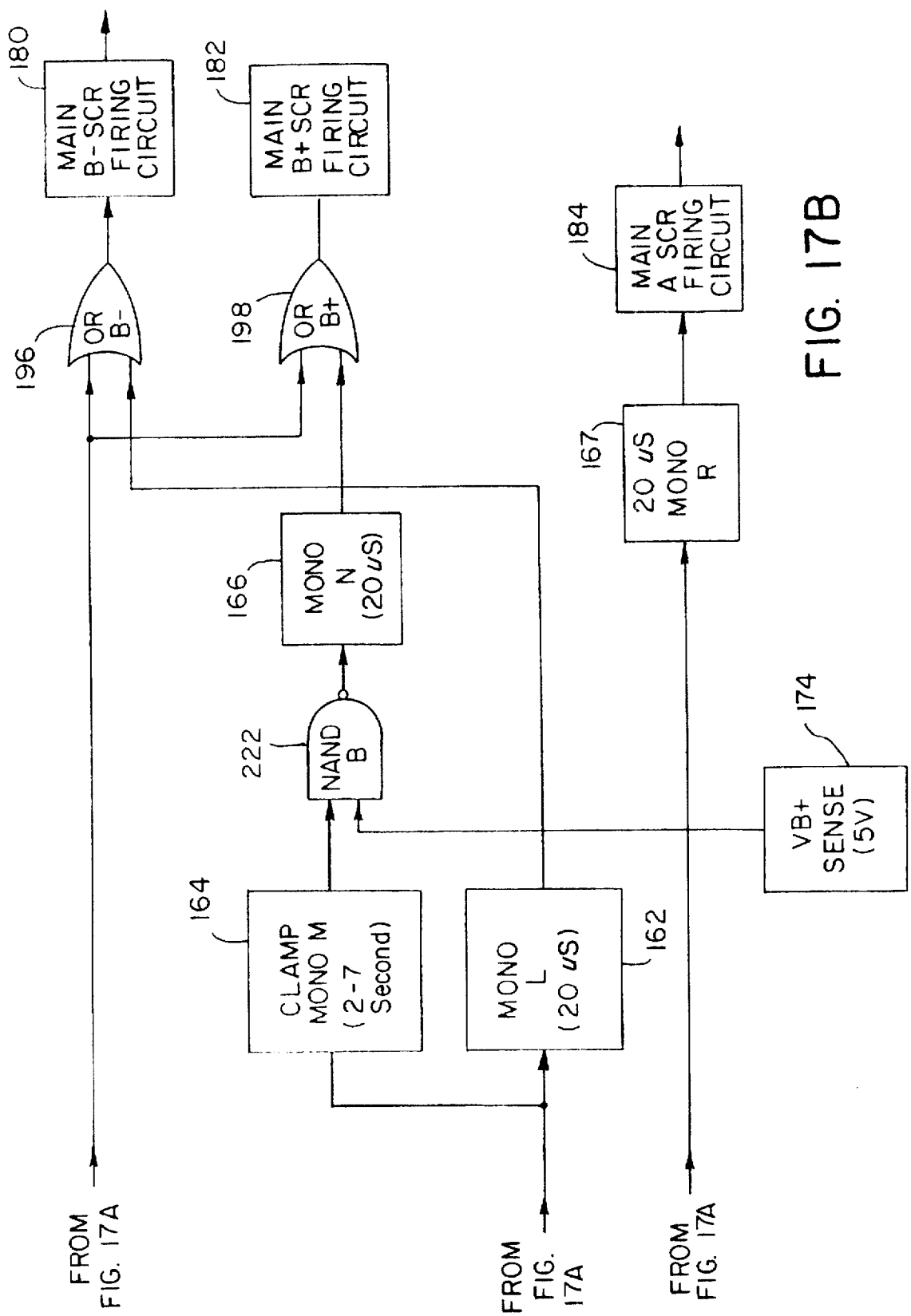
FIG. 17 is a functional block diagram of the control system logic circuit for the DC blocking device of the present invention.

Under fault conditions, triggering of the main bypass path SCRs 64 and 66 and the auxiliary SCRs 70 and 72 is initiated via a control system such as that shown in FIG. 17. The control system sends timing signals to the main firing circuits 180, 182 and 184, which, in turn, send isolated firing pulses to the gates of the SCRs 64, 66, 70, and 72.

Preferably, the DC blocking device 30 is provided with backup firing circuits for the main bypass path SCRs 64 and 66. The backup firing circuits will fire the main SCRs 64 and 66 only in abnormal circumstances, namely, in the event that the main firing circuits 180, 182, and 184 fail to deliver the firing pulses. This failure may occur due to failure of the control system 150, failure of one or more of the main firing circuits 180, 182, or 184, or a failure of the supply of power to the control system 150 or the firing circuits. The function of the backup firing circuits may be restricted to simply firing the main SCRs 64 and 66 to prevent a voltage rise across the blocking device 30. In this situation, it may be acceptable that the main SCRs 64 and 66 remain in conduction after a fault clears, due to inability to turn off due to DC follow-through current. Preferably, the backup firing circuits do not rely on any auxiliary power source. The backup firing circuits may, therefore, be powered directly from the instantaneous anode-cathode voltage across the main SCRs 64 and 66.

Figure 19:
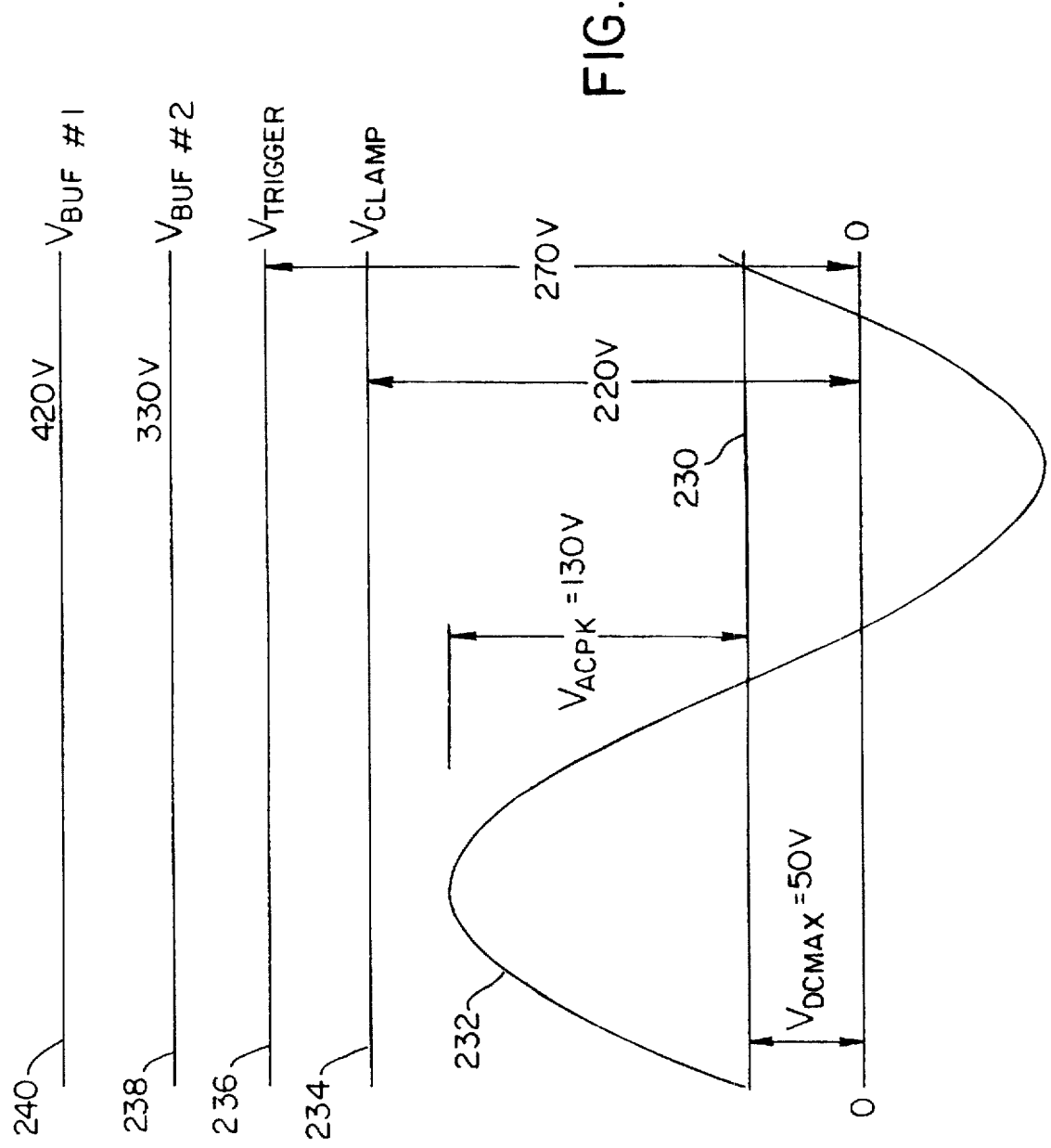
FIG. 19 is a pictorial representation of the relative operating, clamp, triggering, and backup triggering levels for the DC blocking device of the present invention.

Preferably, multiple sets of backup firing circuits are provided. The relative voltage levels at which these backup firing circuits may come into action is described with reference to FIG. 19. This chart shows the maximum allowed DC voltage during normal operation 230 at 50 V, the permissible peak AC voltage 232 at 130 V, the average voltage 234 across the voltage clamp 84 at 220 V, the normal triggering level 236 at 270 V, the triggering level of a primary backup firing circuit 238 at 330 V, and the firing level of a secondary backup firing circuit 240 at 420 V. Thus, the primary backup firing circuits may be set to fire at an anode-cathode voltage across the main SCRs 64 and 66 approximately 22% higher than the normal trigger level set by the main control system 150. The secondary backup firing circuit may be set to fire at an anode-cathode voltage approximately 27% higher than the voltage required for triggering by the primary backup firing circuit. Of course, the voltage levels provided in FIG. 19 may be adjusted for the requirements of particular applications of the DC blocking device 30 of the present invention.

So long as firing of the SCRs 64 and 66 occurs via the main control system 150, the backup firing circuits are inoperative. If, however, the main firing mechanism fails, the main bypass path SCRs 64 and 66 will be fired by the primary backup firing circuit, and the secondary backup firing circuit will remain inoperative. If the main firing mechanism and the primary backup firing system both fail, then the main SCRs 64 and 66 are fired by the secondary backup firing circuit.

A preferred primary backup firing circuit 250 for the DC blocking device 30 is described with reference to the schematic circuit diagram of FIG. 20. The terminals 252 and 254 are connected across the main bypass path SCRs 64 and 66. The peak anode-cathode voltage across the main SCRs 64 and 66 is thus captured on capacitor 256 via diodes 258 and 260. If, under fault conditions, the main firing circuits 180, 182, and 184 have failed to fire, the peak voltage across the capacitor 256 will exceed the first backup triggering level causing the zener diode 262 to conduct. This will cause a voltage to appear at the gate of the switching device 264, e.g., a MOSFET, turning it on. In turn, the gate of the transistor 266 will be connected to the common line 267 through transistor 264, turning it on. This causes a voltage to appear on the gate of transistor 268, turning it on as well. This causes a firing current to flow from capacitor 256, through resistor 270, the transistor 268, the resistor 272, and diode 274 to the terminal 276 which is connected to the gate of a main bypass path SCR 64 or 66. Thus, a backup firing pulse is provided from the energy stored on the capacitor 256, which also provides the power for the backup firing circuit 250 itself.

As was described earlier, the high power DC blocking device of the present invention preferably includes multiple bypass path SCRs connected in parallel for each direction of current, as shown in FIG. 4. Although the trigger levels of the backup firing circuit for each parallel SCR are nominally the same, small differences inevitably exist. Thus, in the absence of additional circuitry, when the trigger level for the first to fire SCR is reached, that SCR will fire, preventing further rise of the anode voltage of the other, paralleled, SCRs. Thus, the backup firing circuits of the other SCRs will not reach their trigger levels, and will never fire their SCRs. This is undesirable, since the one SCR which fires will be required to carry the entire fault current intended to be carried by multiple SCRs in parallel. This could readily damage the SCR required to carry the current.

Figure 21:
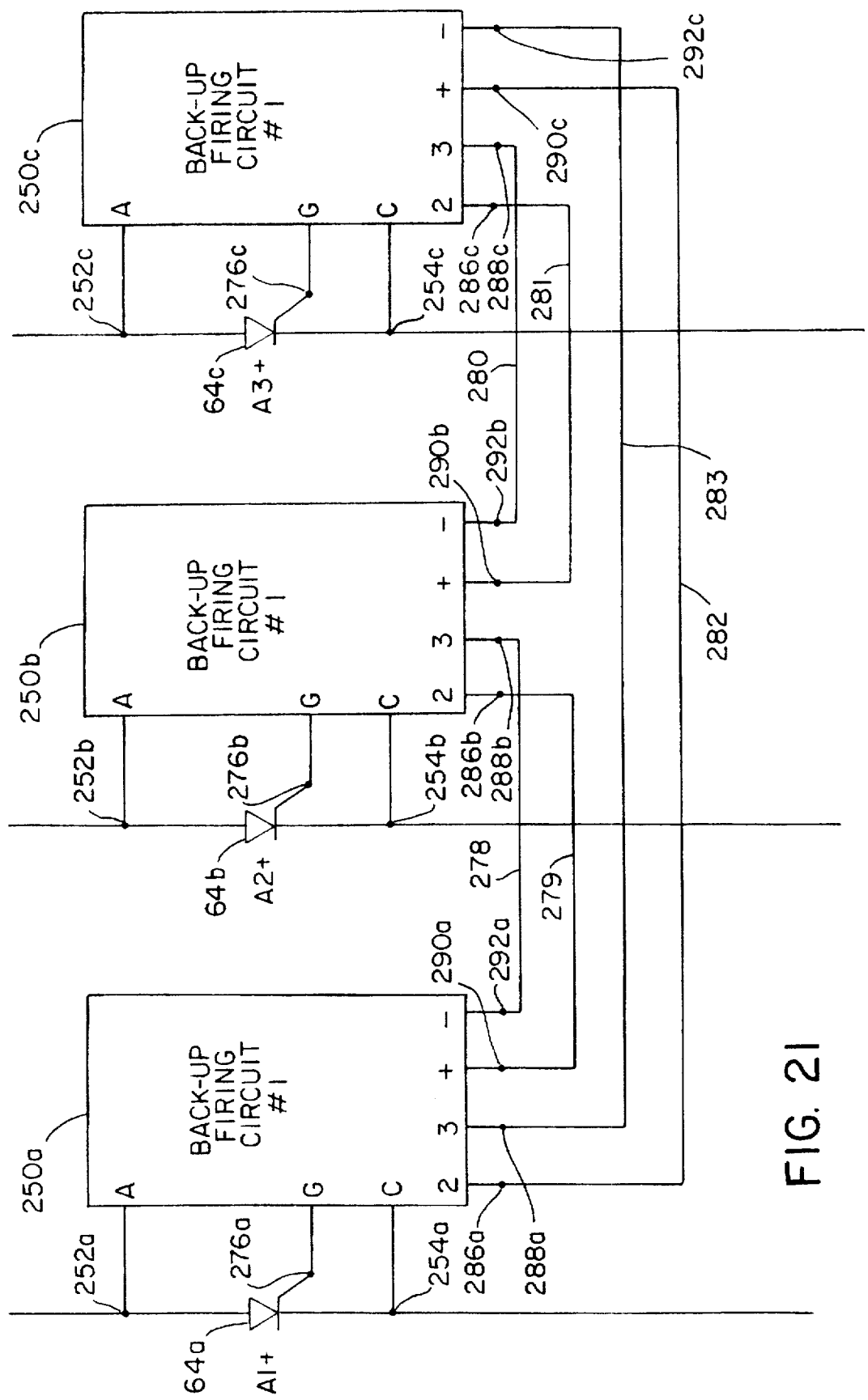
FIG. 21 is a block diagram of multiple primary backup firing circuits connected to ensure the firing of multiple SCRs connected in parallel.

The connection of multiple primary backup firing circuits for parallel connected main SCRs is shown in FIG. 21. To avoid the problem caused by one of the backup firing circuits 250a–c firing before the others, an output pulse associated with the firing of the backup firing circuit is fed from each backup firing circuit to an input of the next circuit to form a circular chain. Thus, for example, an output pulse is fed on lines 278 and 279 from backup firing circuit 250a to backup firing circuit 250b when circuit 250a fires its SCR 64a. Lines 280 and 281 carry an output pulse from backup firing circuit 250b to backup firing circuit 250c when firing circuit 250b provides a firing pulse to its main SCR 64b. Finally, lines 282 and 283 carry a pulse from backup firing circuit 250c to backup firing circuit 250a when circuit 250c delivers a firing pulse to its main SCR 64c.

Figure 20A:
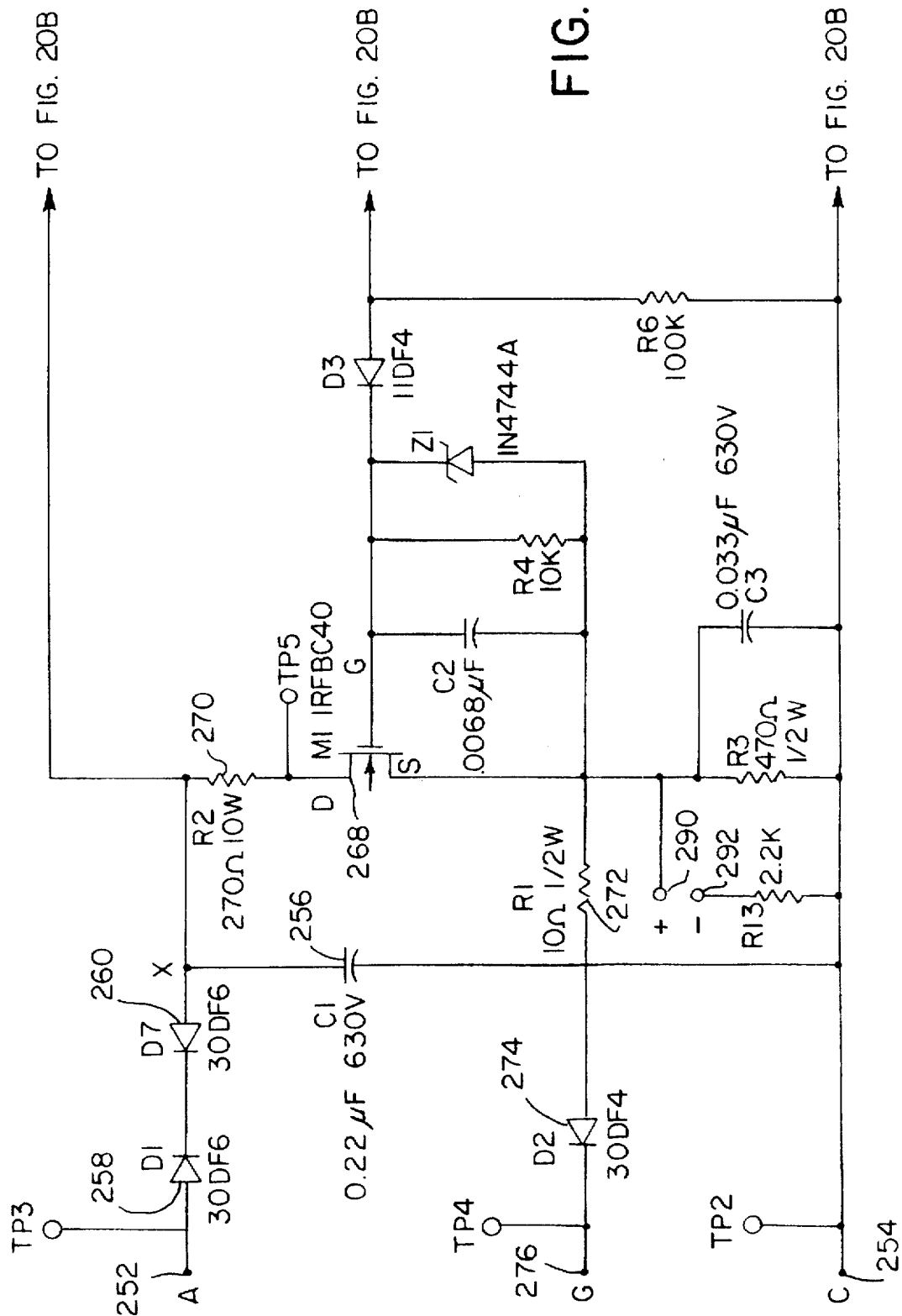
FIG. 20 is a schematic circuit diagram of a primary backup SCR firing circuit for the DC blocking device of the present invention.
Figure 20B:
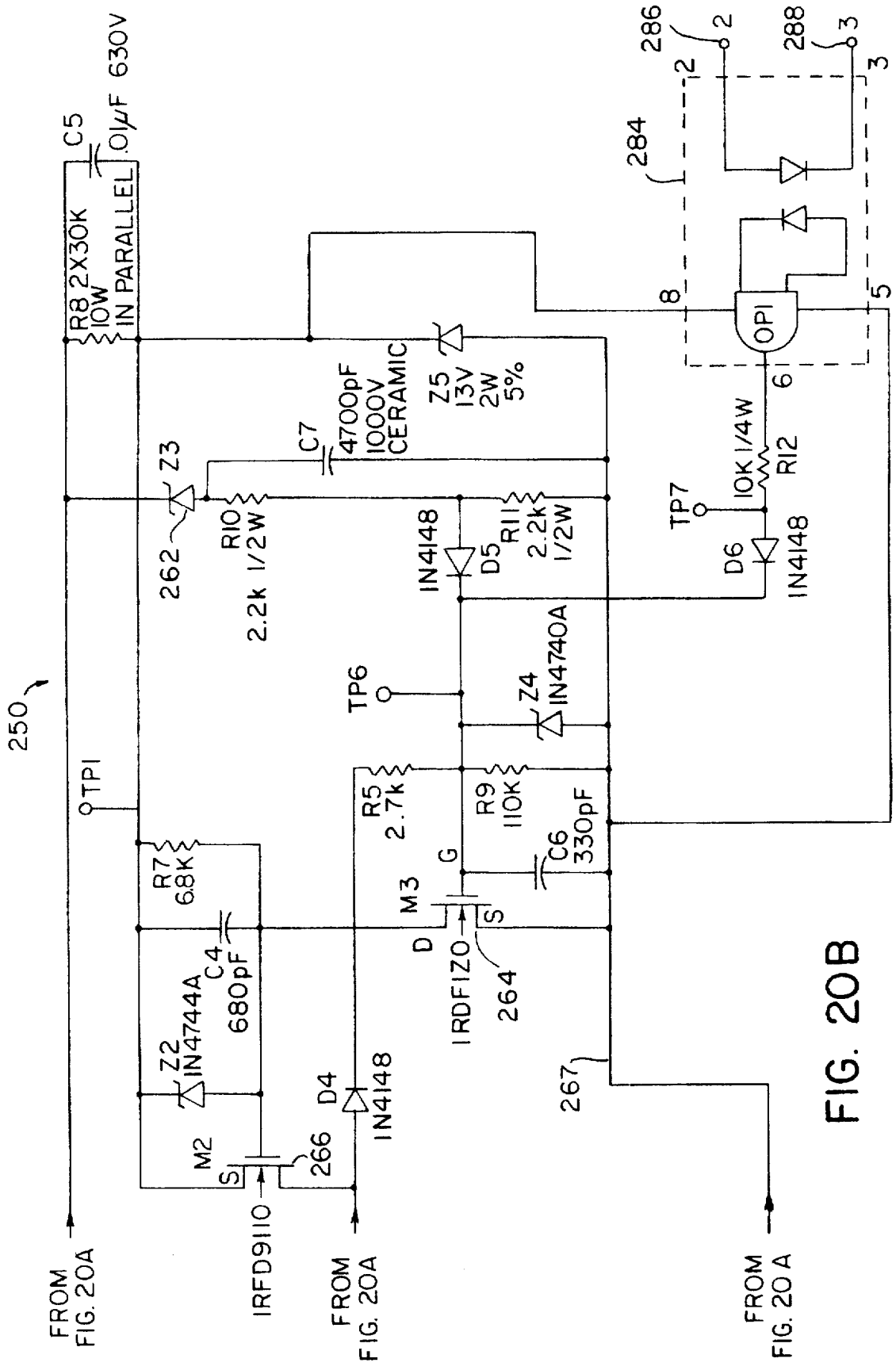

The output pulses of each primary backup firing circuit is received via an opto-isolator 284 at the input of the next backup firing circuit in the chain, as shown in FIG. 20. When a pulse is received at the terminals 286 and 288 of the opto-isolator 284, a voltage is delivered to turn on transistor 264, which, as described earlier, results in a firing pulse being delivered at terminal 276 of the backup firing circuit 250 which, in turn, is connected to the gate of a main SCR. Note that this also causes a voltage to appear on the terminals 290 and 292, which are the terminals which are connected, via the configuration shown in FIG. 21, to the opto-isolator terminals of the adjacent primary backup firing circuit. This interconnection of primary backup firing circuits ensures that all primary backup firing circuits generate an output firing pulse. Thus, all of the main SCRs will turn on, regardless of which SCR triggers first.

Figure 22:
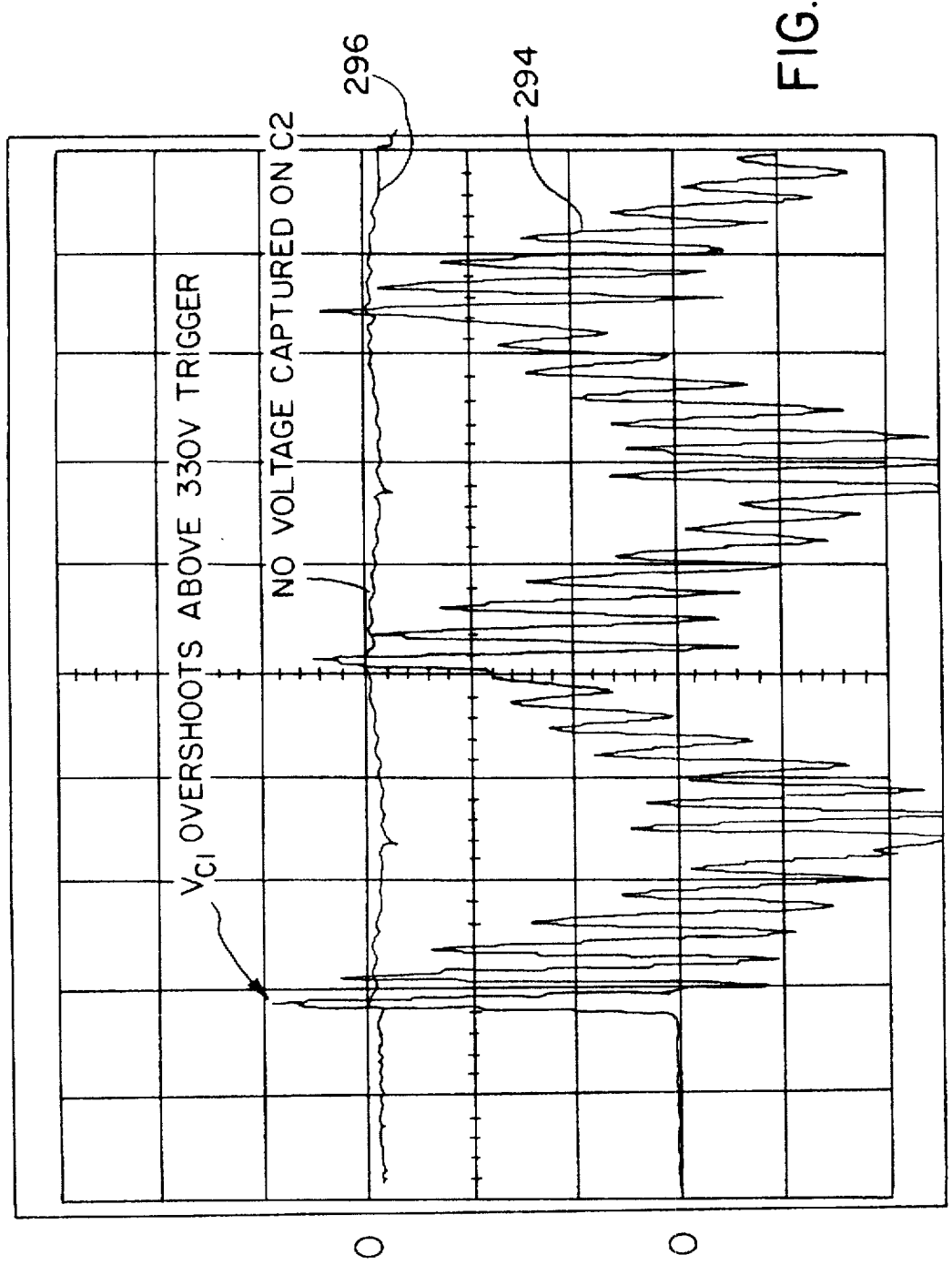
FIG. 22 is an oscillogram of the voltage across the DC blocking device of the present invention with the main firing circuits disabled where the primary SCRs are being fired to conduct a fault current by the primary backup firing circuits.

The oscillogram shown in FIG. 22 shows the voltage waveform 294 across the blocking capacitor 58 of the blocking device 30 when the main SCRs 64 and 66 are fired by the primary backup firing circuit 250. To make this waveform, the main firing circuits 180, 182 and 184 were disabled. A fault current of 17.6 kA was then applied to the blocking device 30. Note that the continuing oscillation of the voltage across the blocking capacitor 58, in combination with inductors 61 and 62, is due to the main SCRs 64 and 66 being continually refired by the primary backup firing circuits 250. The primary backup firing circuits will re-trigger the main SCRs only when the primary backup-trigger level, e.g., 330V, is reached each half cycle. Thus, the resulting oscillations are quite significant, at least as compared with the minor continuous oscillations resulting from continual re-firing of the main SCRs at 20V when they are fired by the control system 150 and main firing circuits 180, 182 and 184. Note also that, since the primary backup firing circuits 150 do not apply any firing pulses to the auxiliary SCRs 70 and 72, no voltage will be captured on the storage capacitor 68, as shown by waveform 296 in FIG. 22.

Figure 23:
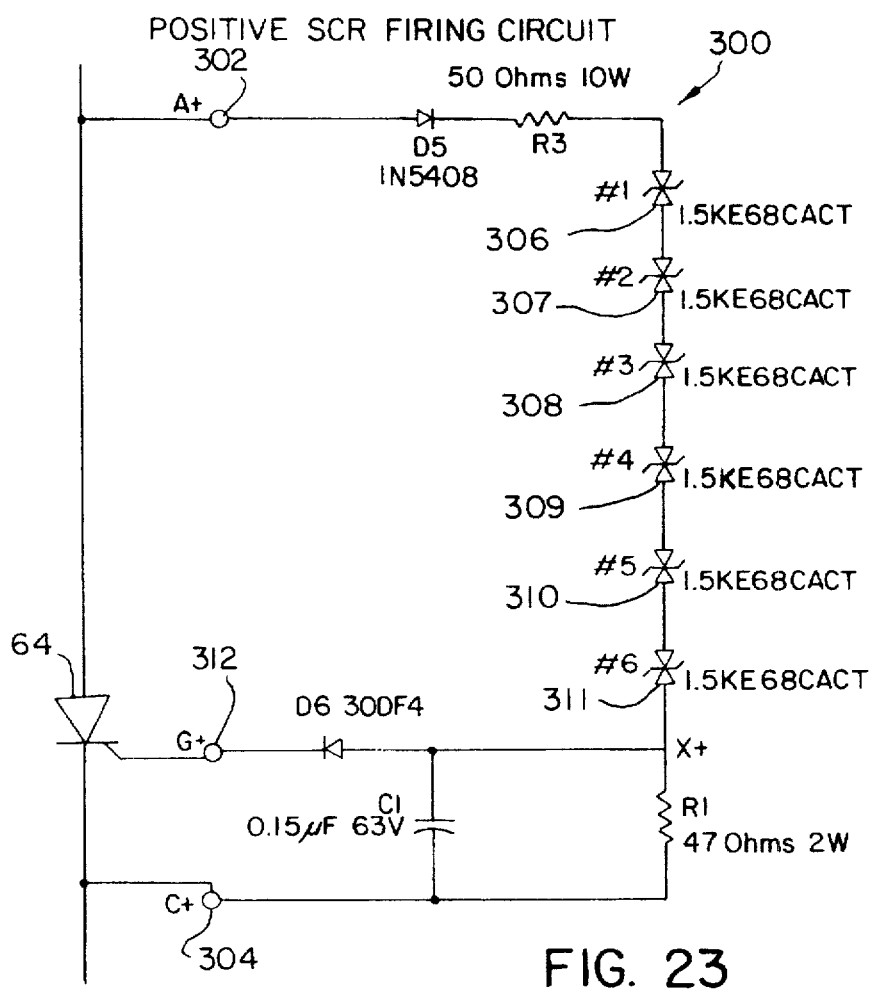
FIG. 23 is a schematic circuit diagram of a secondary backup SCR firing circuit for the DC blocking device of the present invention.

A preferred embodiment of a secondary backup firing circuit 300 is described with reference to the schematic circuit diagram of FIG. 23. The secondary backup firing circuit 300 is connected at terminals 302 and 304 between the anode and cathode of the SCR, e.g., SCR 64, which it is to fire. When the anode-cathode voltage of the SCR 64 exceeds the breakover voltage of the series string of zener diodes 306–311, current flows from the anode terminal 302 through terminal 312 of the secondary backup firing circuit 300 to the gate of the SCR 64, turning the SCR on. One backup secondary firing circuit 300 is provided for each parallel connected SCR in the blocking device 30.

While all secondary backup firing circuits 300 have nominally the same trigger voltage, one backup firing circuit for the parallel SCRs inevitably will fire first. This will cause the voltage across the other paralleled SCRs to drop, preventing the other SCRs from being turned on by their secondary backup firing circuit. This is considered acceptable in this case. The secondary backup firing circuit only operates if both the main firing circuits and the primary backup firing circuits fail to operate. The purpose of the secondary backup firing circuit is as almost a last resort backup to prevent excessive volts from being developed across the blocking device 30 under highly abnormal circumstances. It is accepted that under these abnormal conditions the main SCRs 64 and 66 may be destroyed and become shorted. The very last resort to avoid excessive voltage across the blocking device 30, if even the secondary backup firing circuits 300 should fail to operate, is anode breakover of the SCRs 64 and 66 themselves.

Since the basic purpose of the DC blocking device 30 of the present invention is to restrict flow of DC current, it is important to ensure that the device 30 is performing this function properly. This is preferably accomplished by continually monitoring the current through the blocking device 30 for a DC component, and activating an alarm if the DC current exceeds an alarm limit, e.g., 1 amp. A preferred current sensing circuit which can accurately discern a current of approximately 1 A DC within a normal operating current of 120 A AC is described with reference to the schematic circuit diagram of FIG. 24.

A conventional current transformer 322 is connected in series with a low resistance shunt 324 on the line 59 which carries current into the blocking device 30. The resistance of the shunt 324 must be as low as practical in order to limit power dissipation under AC fault current conditions. A shunt value of 1 milliohm gives a DC voltage across the shunt 324 of 1 millivolt at one amp DC. With 27 kA AC surge current, the power dissipated in the one milliohm shunt is 27 V×27 kA=729 kW. The total energy absorbed by the shunt over a ½ second period is then 365 kJ.

A preferred design of a low resistance shunt 324, which is able to withstand the required fault current levels, is described with reference to FIG. 25. Tests of this shunt design at 27 kA AC for ½ second, with a resulting temperature rise of 225 degrees C., confirms the ability of the shunt 324 to handle large fault currents. The shunt includes two conducting blades, 326 and 328. The inner blade 326 fits inside the outer blade 328. The blades may be made of a ⅛ inch by 3 inch strip of constantan, e.g., Harrison alloy #106, which is 2.65% manganese, 41.7% nickel, and the balance copper, bent into a T shape. The shunt blades 326 and 328 are approximately 18 inches in their longest dimension, and 9 inches across the top of the T formed by their top surfaces 330 and 332, respectively. The blades 326 and 328 are placed one inside the other and may be joined by brazing together at the ends of their top surfaces 330 and 332. A blade former 334, made of ¼ inch phenolic, is placed in the center of the inner blade 326. Inner clamp blocks 336 and 338, and outer clamp blocks 340 and 342, made of ½ inch thick phenolic, enclose the blades 326 and 328 on their open ends. The clamp blocks 336, 338, 340, and 342 are connected together with bolt assemblies, including bolts 344, washers 346 and 348, and nuts 350, which extend through holes 352, 354, 356 and 358 in clamp blocks 342, 338, 336, and 340, respectively. Outer clamp block 340 includes a hole 360 in which a BNC connector 362 may be placed. The hole 360 is aligned with a wiring groove 364 in the inner clamp block 336. When assembled, the wiring groove 364 may contain a wire which connects the BNC connector 362 to the blades 326 and 328. From the BNC connector, a cable, not shown, may be run to the amplifier 366 as shown in FIG. 24. Finally, the shunt assembly 324 includes a shunt base 368, made, e.g., of ½ inch phenolic, which contains holes 370 aligned with holes 372 and 374, in the positive and negative sides of the conducting blades 326 and 328. Thereby, the conducting line 59, shown in FIG. 24, is connected to the blades 326 and 328 through the shunt base 368.

Referring once again to FIG. 24, the voltage across the shunt 324 represents the total current, i.e., AC and DC components, $I_{AC}+I_{DC}$, through the DC blocking device 30. The output of the current transformer 322, however, represents only the AC component of the current, $I_{AC}$. The current transformer 322 cannot transmit the DC component, $I_{DC}$.

The output of the current transformer is connected to an amplifier 376. As has already been mentioned, the voltage across the shunt is connected to amplifier 366. The outputs of the amplifiers 366 and 376 are connected, in phase opposition, to the inputs of a summing amplifier 378. At the summing amplifier 378, the AC components of the signals from the current transformer 322 and shunt 324 cancel each other. Thus, the output of the summing amplifier 378 represents just the residual DC component of the current. In practice, it may be found that perfect cancellation of the AC components at the output of the summing amplifier 378 is not possible. This may be because of small practical inaccuracies in the circuit 320 and a small phase error introduced by the current transformer 322. However, these small residual AC components can be removed with relatively modest low pass filtering.

A key feature of the current monitoring circuit 320 is the removal of the bulk of the AC component of the current signal from the DC signal which is to be monitored. This is accomplished by connecting the outputs of the current transformer 322 and the resistive shunt 324 in phase opposition. A more obvious way of removing the AC component from the shunt signal would be to configure the amplifier 366 as a low-pass filter to attenuate the AC components of the current while amplifying the DC components. In such an arrangement, the transformer 322 and amplifier 376 would not be needed. However, for the high power DC blocking device of the present invention, it is required that the AC component be attenuated from a peak input value of, e.g., 170 times greater than the DC component, to an output value about 1/100 of the DC component. The corresponding AC attenuation ratio would be about 6×10⁻⁵. With such a large attenuation ratio, the DC output signal could lag the input by tens of seconds. Such a slow response may be acceptable from the viewpoint of the time lag before an alarm signal is delivered. However, a much faster response is needed for the purpose of periodically checking the operation of the DC current sensing circuit 320 itself, as described in more detail below.

A comparator 380 compares the output voltage of the summing amplifier 378 with a fixed reference voltage, representing, e.g., 1 A DC. If the output of the summing amplifier 378 exceeds the reference, the output of the comparator 380 applies a voltage that excites the coil of a protective relay 382. The relay 382 may thus be connected to produce an alarm when the DC component of the total current exceeds the reference level.

Preferably, the DC current monitoring circuit 320 is periodically checked for proper operation. This is preferably accomplished by passing a short, e.g., less than one second duration pulse of DC test current through the shunt 324. This current pulse may be applied from an independent local source (not shown). The output of the circuit 320 can then be observed to ensure that a correct response is obtained to the test current.

A preferable test sequence for the DC current sensing circuit 320 includes applying a pulse to the shunt 324 by turning on a switch, such as a transistor 384, to connect the independent local power source to the shunt for, e.g., a 0.4 second duration approximately every 5 minutes. The turning on of the transistor 384 causes a current of about 1 amp DC to flow from the 12 volt local power supply via a resistor 386 through the shunt 324. The one amp DC pulse current causes the output of the comparator 380 to deliver a corresponding pulse of voltage to the coil of the relay 382. However, duration of the test pulse is chosen such that the pick-up time delay of the relay 382 is greater than the duration of the test pulse. Thus, the relay 382 does not pick up during the test, and no alarm is generated. Instead, the test pulse voltage across relay 382 is detected by a circuit including a diode 388, a capacitor 390, a resistor 392, and a transistor 394. The discharge time of the capacitor 390 is set by the resistor 392 to be greater than the five minute repetition rate of the test pulses. Note that a five minute hold-up period may be beyond the practicality of a simple RC circuit, therefore, the hold-up of the voltage in between test pulses may be achieved by means of a counter which is reset whenever a test pulse is received. Thus, so long as test pulses continue to arrive at relay 382 at regular intervals, the transistor 394 will be ON and a test relay 396 will remain energized. The test relay may, for example, be used to connect an indicator light which will indicate the state of health of the DC current sensing circuit 320. If test pulses stop arriving, indicating a failure of the DC current sensing circuit 320, the transistor 394 will turn off, and the test relay 396 will de-energize. The de-energizing of the test relay 396 may preferably result in the activation of a DC sensing circuit failure alarm. Note that the test relay 396 will also deactivate if the independent power supply fails.

Figure 26:
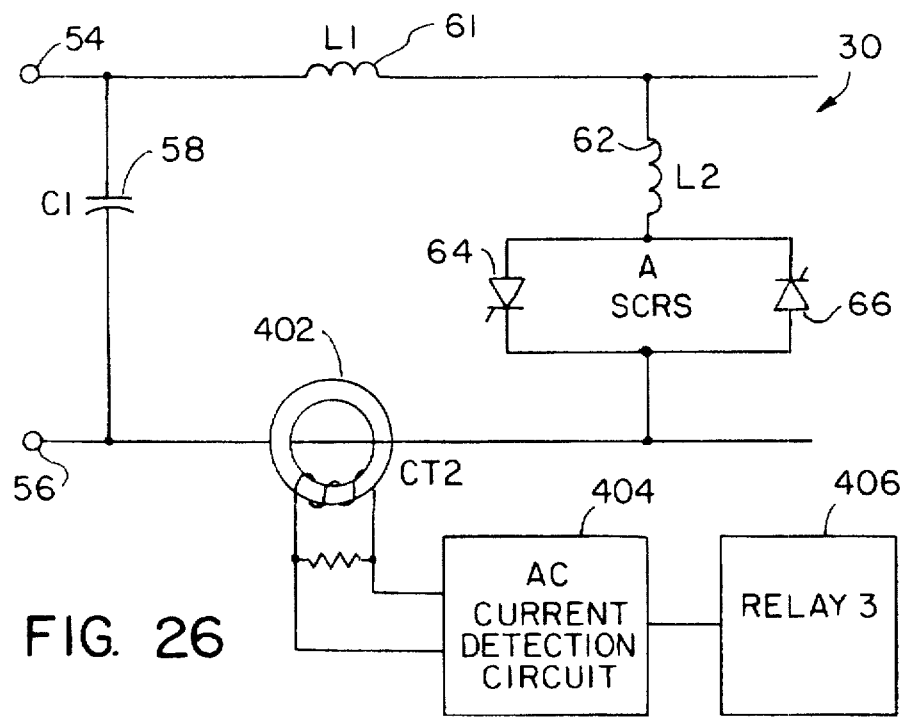
FIG. 26 is a schematic circuit diagram of a backup SCR AC current checking circuit for the DC blocking device of the present invention.

Preferably, the DC blocking device 30 of the present invention also includes an AC current sensing circuit, which provides an additional back-up alarm. A preferred circuit for AC current sensing 400 is described with reference to the schematic circuit diagram of FIG. 26, showing a portion of the DC blocking device 30. In normal operation, the main SCRs 64 and 66 are off. Thus, no current flows through the current transformer 402. Current through the transformer 402 is detected using a conventional AC current detection circuit 404. The current detection circuit 404 is connected to activate an AC current detection relay 406 when AC current is detected at the current transformer 402. Thus, when no current is flowing through the transformer 402, the relay 406 is de-energized.

If AC current above an AC current threshold, e.g., 3 amps, flows through the current transformer 402, the AC current detection circuit 404 will energize the relay 406. This, in turn, will activate an alarm. The alarm indicates that the main SCRs 64 and 66 are in conduction. Thus, a DC current could potentially be flowing through the DC blocking device through the SCRs 64 and 66. The pickup time delay of the AC current detection relay 406 can be set so that the relay does not actuate during transient fault conditions.

Figure 27:
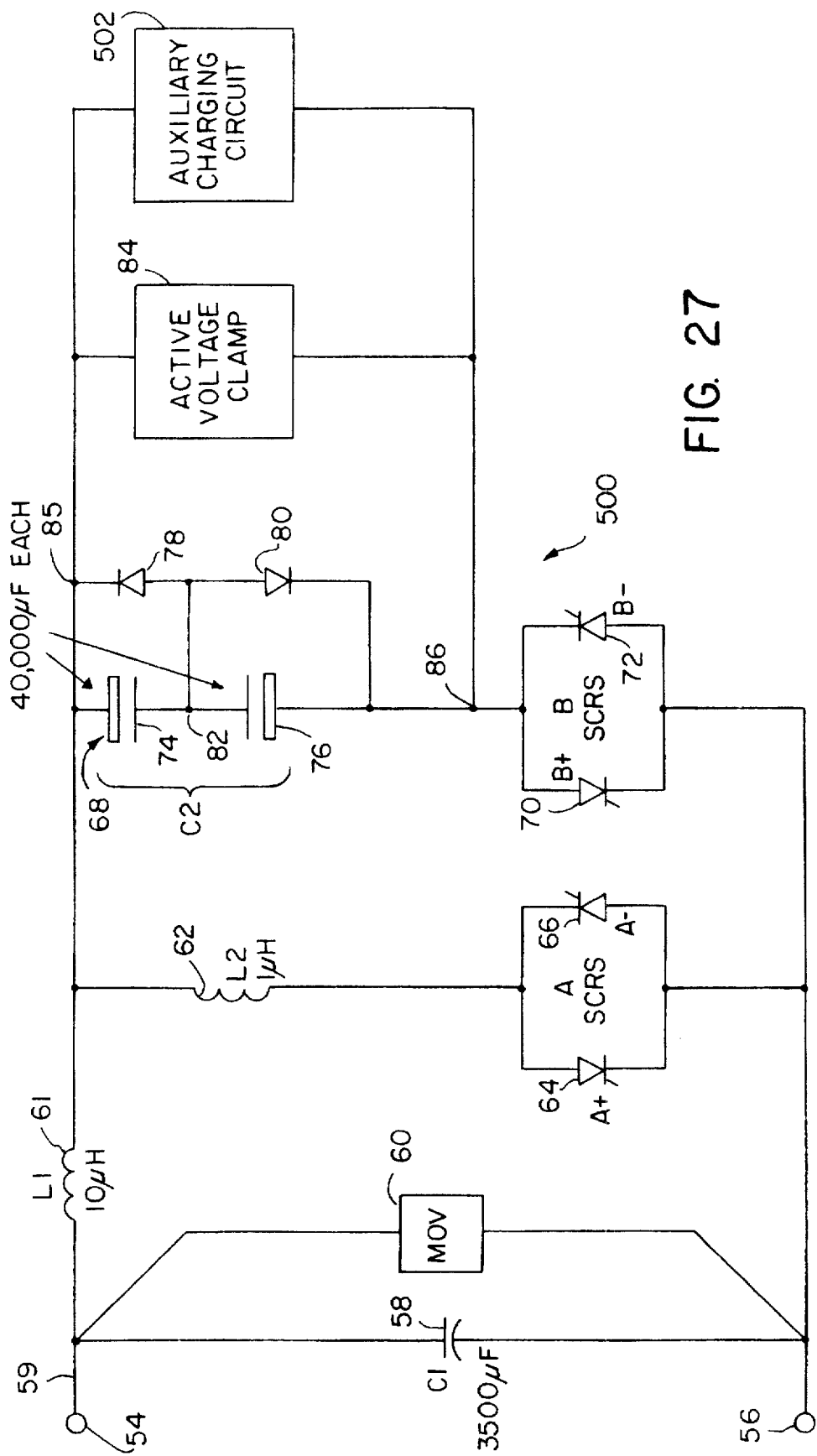
FIG. 27 is a schematic circuit diagram of a high power DC blocking device in accordance with the present invention for low temperature operation having an auxiliary storage capacitor charging circuit.

An alternative embodiment of a DC blocking device in accordance with the present invention is illustrated at 500 in FIG. 27. The blocking device 500 operates in essentially the same manner as the blocking device 30 of FIG. 3, and hence the same reference numerals as are used in FIG. 3 are used in FIG. 27 to refer to similar parts of the blocking devices. The blocking device 500, however, includes an auxiliary charging circuit 502 connected across the storage capacitor 68. The auxiliary charging circuit 502 ensures that the storage capacitor 68 will be charged to a sufficient voltage level to commutate off the main switching devices 64 and 66 even under extremely cold operating conditions.

If the temperature of the storage capacitor 68 is below 0° C., the effective series resistance (ESR) of the capacitor 68 becomes relatively high. This can result in the voltage drop across the ESR, due to the high-amplitude short-duration pulse of charging current used to charge the capacitor 68, leaving insufficient captured voltage on the storage capacitor for subsequent commutation of the main SCRs 64 and 66. Recall that the polarity of voltage initially captured on the storage capacitor 68 depends on the initial polarity of the fault current. However, as illustrated in FIG. 11, a "negative" voltage on the storage capacitor 68 is required, for example, for commutation of a "positive" DC current in the forward conducting main SCR 64. At normal temperatures, a "positive" voltage captured on the storage capacitor 68 will ring around through the auxiliary SCR 70 and main SCR 66 to charge the storage capacitor 68 negatively to commutate off the main SCR 64 (this was described previously with reference to FIGS. 12 and 13). However, at operating temperatures below about 0° C., the increased ESR of the storage capacitor 68 may prevent satisfactory reversal of the polarity of the voltage in the capacitor.

A thermostatically controlled heater (not shown) may be provided within the storage capacitor 68 sub-assembly to keep the temperature of the storage capacitor above 0° C. at outside temperatures greater than about −20° C. Thus, provided the outside ambient temperature is higher than about −20° C., the firing of the auxiliary SCRs 70 and 72 will capture sufficient voltage across the storage capacitor for commutation of the main SCRs 64 and 66.

The auxiliary charging circuit 502 is provided for applications of the DC blocking device 500 where abnormally low temperatures are expected. Under these operating conditions, the energy stored in the storage capacitor 58 following initial firing of the auxiliary SCRs 70 and 72 will be insufficient to commutate off the main SCRs 64 and 66 (even where the heater described above is used). The auxiliary charging circuit 502 independently charges the storage capacitor 68 to a negative voltage of, for example, 40V, during the time when the main SCRs 64 and 66 are on and conducting a fault current. The period where the main SCRs 64 and 66 are on and conducting will be several seconds in duration. The required charging current for the storage capacitor over this relatively long period is low, and the voltage drop across the ESR of the storage capacitor 68, even at an abnormally low temperature, is insignificant.

The auxiliary charging circuit 502 preferably charges the storage capacitor to a negative voltage level each time the main SCRs 64 and 66 are in conduction, regardless of the initial charge captured in the storage capacitor 68, by the initial firing of the auxiliary SCRs 70 and 72. A stored voltage of −40V is sufficient to commutate off the main SCRs 64 and 66 at any ambient temperature down to about −30° C. Note that the auxiliary charging circuit 502 does not affect the operation of the auxiliary SCRs 70 and 72. Thus, if the auxiliary charging circuit 502 is faulty, the main SCRs 64 and 66 will still be commutated off by the voltage initially captured on the storage capacitor 68 by the initial firing of the auxiliary SCRs 70 and 72, provided the outside temperature is not abnormally low.

Figure 28:
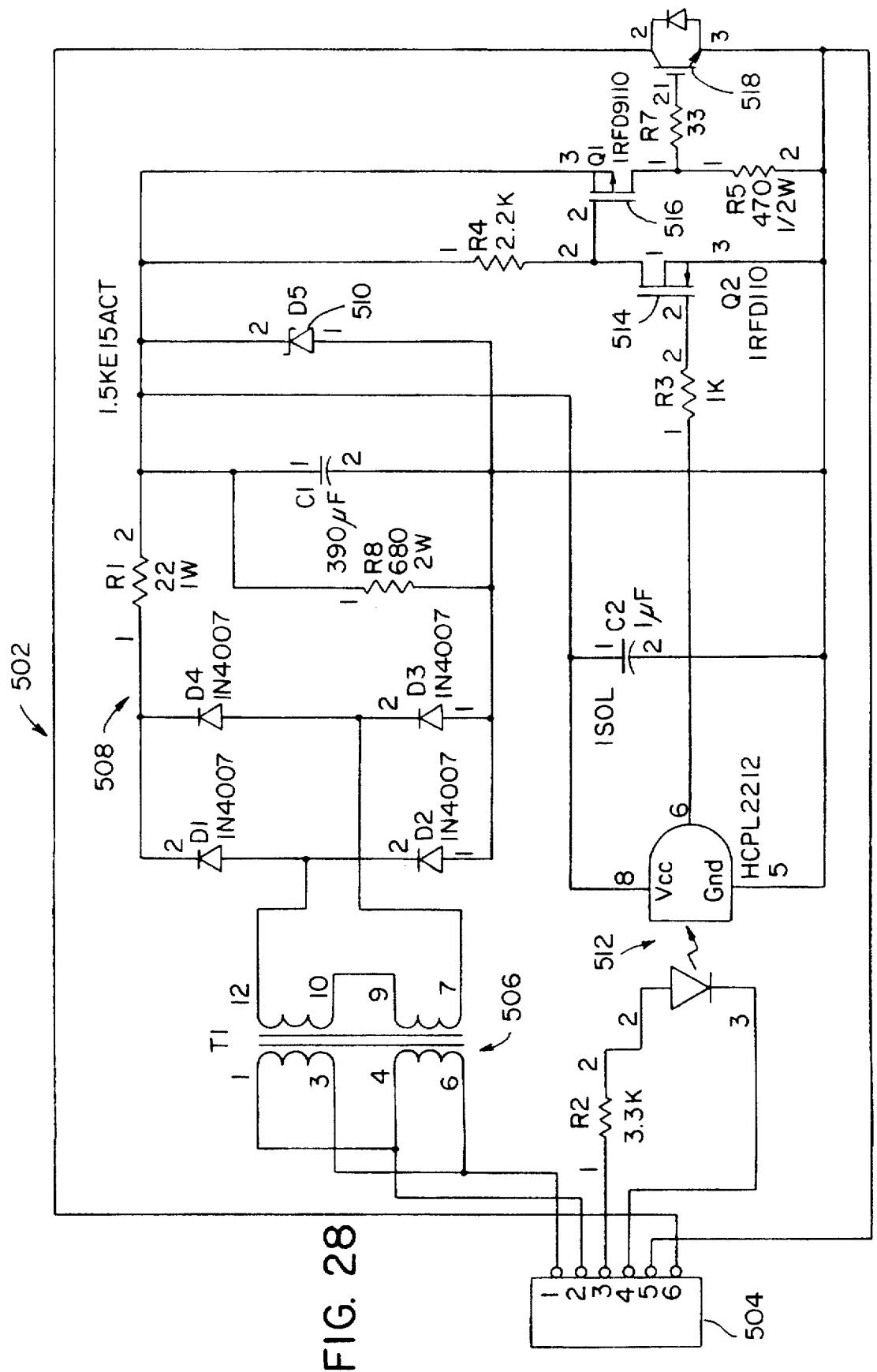
FIG. 28 is a schematic circuit diagram of the auxiliary storage capacitor charging circuit of FIG. 27.

An exemplary circuit for implementing the auxiliary charging circuit 502 is illustrated in FIG. 28. The auxiliary charging circuit 502 is connected to the rest of the DC blocking device 500 through a connector 504. AC power for the auxiliary charging circuit is provided on pins 1 and 2 of the connector through a conventional transformer 506 and rectifier circuit 508 where the AC signal is rectified and filtered. The output of the rectifier circuit 508 is maintained at a DC voltage level by means of zener diode 510 to provide power to, for example, opto-coupler 512. The input to the opto-coupler 512 is connected, via pins 3 and 4 of the connector 504, to the DC blocking device controller. During the conduction period of the main SCRs 64 and 66, and so long as the voltage on the storage capacitor 68 is less than that required, the opto-coupler 512 is turned on by the DC blocking device controller. This, in turn, turns on transistors 514, 516, and 518. The turning on of transistor 518 creates a conduction path via pins 5 and 6 of the connector 504 through the auxiliary charging circuit 502 to allow the storage capacitor 68 to charge to the desired voltage level.

It is understood that the invention is not confined to the particular embodiments, construction and arrangement of parts herein illustrated and described, but embraces such modified forms thereof as come within the scope of the following claims.

What is claimed is:

1. A DC blocking device, comprising:
   (a) a DC blocking capacitor connected between two terminals of the blocking device;
   (b) a main bypass path connected in parallel with the DC blocking capacitor and including a main switching device which is responsive to main triggering signals to create a low impedance path between the terminals of the blocking device;
   (c) an auxiliary bypass path connected in parallel with the main bypass path and including a storage capacitor connected in series with an auxiliary switching device which is responsive to first and second auxiliary triggering signals to electrically connect the storage capacitor in parallel with the main bypass path; and
   (d) controller means for providing the first auxiliary triggering signal when a fault condition causes the voltage level across the DC blocking capacitor to exceed a triggering voltage level to allow the storage capacitor to charge to a stored voltage level, for providing the main triggering signal when the storage capacitor is charged to the stored voltage level, and for providing the second auxiliary triggering signal when the fault condition has cleared to apply the stored voltage in the storage capacitor across the main switching devices to commutate them off.

2. The DC blocking device of claim 1 comprising additionally a varistor connected in parallel with the DC blocking capacitor.

3. The DC blocking device of claim 1 comprising additionally a capacitor discharge means for discharging the storage capacitor to the stored voltage level when the voltage on the storage capacitor exceeds the stored voltage level.

4. The DC blocking device of claim 3 wherein the controller means includes means for delaying providing the second auxiliary triggering signal until after the voltage on the storage capacitor has been discharged to remove all excess voltage above the stored voltage level.

5. The DC blocking device of claim 1 wherein the controller means includes means for delaying providing the second auxiliary triggering signal until after a cooldown period has passed, the cooldown period beginning after the fault condition has cleared.

6. The DC blocking device of claim 1 wherein the controller means includes means for providing the second auxiliary triggering signal only when the polarity of an AC current through the main bypass path is not the same as a polarity of a DC current through the main bypass path.

7. The DC blocking device of claim 1 additionally comprising a voltage clamp circuit connected across the storage capacitor to dissipate DC energy stored in system inductances during a clamping period following the clearing of the fault condition.

8. The DC blocking device of claim 7 wherein the voltage clamp circuit includes means for maintaining a constant average voltage level across the DC blocking device during the clamping period.

9. The DC blocking device of claim 8 wherein the constant average voltage level maintained by the voltage clamp circuit is independent of a level of DC current through the blocking device during the clamping period.

10. The DC blocking device of claim 1 additionally comprising a primary backup firing circuit means for turning on the main switching device to create a low impedance path between the terminals of the blocking device if the controller means fails to provide the main triggering signal thereby resulting in the voltage across the DC blocking capacitor exceeding a primary backup triggering voltage level which is greater than the triggering voltage level.

11. The DC blocking device of claim 10 additionally comprising a secondary backup firing circuit means for turning on the main switching device of the main bypass path to create a low impedance path between the terminals of the blocking device if the controller means fails to provide the main triggering signal and the primary backup firing circuit means fails to turn on the main switching device thereby resulting in the voltage across the DC blocking capacitor exceeding a secondary backup triggering voltage level which is greater than the primary backup triggering voltage level.

12. The DC blocking device of claim 1 wherein the main bypass path includes a plurality of parallel pairs of main switching devices connected in anti-parallel which are responsive to the main triggering signal to create a low impedance path between the terminals of the blocking device.

13. The DC blocking device of claim 12 comprising additionally a primary backup firing circuit means connected to each main switching device for turning on the main switching device to create a low impedance path between the terminals of the blocking device when the controller means fails to provide the main triggering signal thereby resulting in the voltage across the DC blocking capacitor exceeding a primary backup triggering voltage level which is greater than the triggering voltage level, and wherein each primary backup firing circuit means includes means for sending a signal when it turns on the main switching device to which it is connected to a next primary backup firing circuit means in a chain of primary backup firing circuit means and means for turning on the main switching device to which the primary backup firing circuit means is connected in response to the signal received from another primary backup firing circuit means in the chain to assure that all parallel connected main switching devices are turned on.

14. The DC blocking device of claim 1 including a DC current sensing means for activating an alarm when a DC current through the blocking device exceeds an allowed DC current level.

15. The DC blocking device of claim 14 wherein the DC current sensing means includes:

(a) a low resistance shunt connected in a current path of the DC blocking device and providing a signal corresponding to a combined AC and DC current through the blocking device;

(b) AC current detection means connected in the current path of the DC blocking device for providing a signal corresponding to the AC current through the blocking device;

(c) summing means for summing the signals provided by the low resistance shunt and the AC current detection means in phase opposition to provide a DC component signal corresponding to the DC current through the blocking device; and (d) comparator means for comparing the DC component signal to an allowed DC current level signal and for producing a comparison signal for activating the alarm when the DC current through the blocking device exceeds the allowed DC current level.

16. The DC blocking device of claim 14 including means for monitoring the DC current sensing means to determine proper operation of the DC current sensing means.

17. The DC blocking device of claim 1 additionally comprising a current monitoring means for monitoring AC current through the main bypass path and activating an alarm if the AC current through the main bypass path exceeds an allowed AC current level.

18. A DC current sensing circuit for detecting a small DC current in a high power DC blocking device in the presence of a large AC current in the high power DC blocking device, comprising:

(a) a low resistance shunt connected in a current path of the DC blocking device and providing a signal corresponding to a combined AC and DC current through the blocking device;

(b) AC current detection means connected in a current path of the DC blocking device for providing a signal corresponding to the AC current through the blocking device;

(c) summing means for summing the signal provided by the low resistance shunt and the signal provided by the AC current detection means in phase opposition to provide a DC component signal corresponding to the DC current through the blocking device; and (d) comparator means for comparing the DC component signal with an allowed DC current level signal and providing a comparison signal which indicates when the DC component signal exceeds the allowed DC current level signal.

19. The DC current sensing circuit of claim 18 additionally comprising an alarm means for producing an alarm when the comparison signal indicates that the DC component signal exceeds the allowed DC current level signal.

20. The DC current sensing circuit of claim 18 additionally comprising means for monitoring the DC current sensing circuit to determine proper operation of the DC current sensing circuit.

21. The DC current sensing circuit of claim 20 wherein the means for monitoring the DC current sensing circuit includes means for applying a periodic DC current pulse having a magnitude at least as great as the allowed DC current level through the shunt and means for indicating a failure of the DC current sensing circuit if the comparison signal does not reflect the DC current pulse.

22. A DC blocking device, comprising:

(a) a DC blocking capacitor connected between two terminals of the blocking device;

(b) a main bypass path connected in parallel with the DC blocking capacitor and including a plurality of switching devices connected in parallel which are responsive to main triggering signals and primary backup triggering signals to create a low impedance path between the terminals of the blocking device;

(c) controller means for providing the main triggering signals when a fault condition causes the voltage level across the DC blocking capacitor to exceed a triggering voltage level; and (d) primary backup firing circuit means connected to each switching device for providing the primary backup triggering signal to create a low impedance path between the terminals of the blocking device when the controller means fails to provide the main triggering signal thereby resulting in the voltage across the DC blocking capacitor exceeding a primary backup triggering voltage level which is greater than the triggering voltage level, and wherein each primary backup firing circuit means includes means for sending a signal when it provides the primary backup triggering signal to the switching device to which it is connected to a next primary backup firing circuit means in a chain of primary backup firing circuit means and means for providing the primary backup triggering signal to the switching device to which the primary backup firing circuit means is connected in response to the signal received from another primary backup firing circuit means in the chain to assure that all parallel connected switching devices are turned on.

23. The DC blocking device of claim 22 additionally comprising a secondary backup firing circuit means for turning on the switching devices of the main bypass path to create a low impedance path between the terminals of the blocking device if the controller means fails to provide the main triggering signal and the primary backup firing circuit means fail to provide the primary backup triggering signal to turn on the switching devices thereby resulting in the voltage across the DC blocking capacitor exceeding a secondary backup triggering voltage level which is greater than the primary backup triggering voltage level.

24. A method for blocking the flow of normal DC current between two terminals of a DC blocking device while allowing free flow of normal AC current and fault currents between the terminals, comprising the steps of:

(a) connecting a DC blocking capacitor between the terminals of the blocking device;

(b) connecting a storage capacitor between the terminals when a fault condition results in a voltage level across the DC blocking capacitor exceeding a fault triggering voltage level to charge the storage capacitor to a stored voltage level;

(c) disconnecting the storage capacitor from between the terminals and switching on a main switching device in a main bypass path to create a low impedance path between the terminals when the storage capacitor has been charged to the stored voltage level; and (d) applying the stored voltage in the storage capacitor across the main switching device when the fault condition has cleared to commutate off the main switching device.

25. The method of claim 24 comprising additionally the step of discharging the storage capacitor to the stored voltage level when the voltage on the storage capacitor exceeds the stored voltage level.

26. The method of claim 25 wherein the step of applying the stored voltage in the storage capacitor across the main switching device is delayed until after the voltage on the storage capacitor has been discharged to remove excess voltage above the stored voltage level.

27. The method of claim 24 wherein the step of applying the stored voltage in the storage capacitor across the main switching device in the main bypass path is delayed until after a cooldown period has passed, the cooldown period beginning after the fault condition has cleared.

28. The method of claim 24 wherein the step of applying the stored voltage in the storage capacitor across the main switching device occurs only when the polarity of an AC current through the main bypass path is not the same as a polarity of a DC current through the main bypass path.

29. The method of claim 24 comprising additionally the step of dissipating DC energy stored in system inductances during a clamping period following the clearing of the fault condition.

30. The method of claim 24 comprising additionally the step of activating an alarm when a DC current through the blocking device exceeds an allowed DC current level.

31. A method for blocking the flow of normal DC current between two terminals of a DC blocking device while allowing free flow of normal AC current and fault currents between the terminals, comprising the steps of:

(a) connecting a DC blocking capacitor between the terminals of the blocking device;

(b) connecting a storage capacitor between the terminals when a fault condition results in a voltage level across the DC blocking capacitor exceeding a fault triggering voltage level to charge the storage capacitor to a stored voltage level;

(c) switching on a main switching device in a main bypass path to create a low impedance path between the terminals when the storage capacitor has been charged to the stored voltage level;

(d) applying the stored voltage in the storage capacitor across the main switching device when the fault condition has cleared to commutate off the main switching device; and (e) activating an alarm when a DC current through the blocking device exceeds an allowed DC current level by:

connecting a low resistance shunt in a current path of the DC blocking device for providing a signal corresponding to a combined AC and DC current through the blocking device;

providing a signal corresponding to the AC current through the blocking device;

summing the signal provided by the low resistance shunt and the signal corresponding to the AC current through the blocking device in phase opposition to provide a DC component signal corresponding to the DC current through the blocking device;

comparing the DC component signal to an allowed DC current level signal to provide a comparison signal which indicates when the DC component signal exceeds the allowed DC current level signal; and activating the alarm when the comparison signal indicates that the DC component signal exceeds the allowed DC current level signal.

32. The method of claim 24 comprising additionally the steps of monitoring an AC current through the main bypass path and activating an alarm if the AC current through the main bypass path exceeds an allowed AC current level.

33. A method for detecting a small DC current in a high power DC blocking device in the presence of a large AC current in the high power DC blocking device, comprising the steps of:

(a) connecting a low resistance shunt in a current path of the DC blocking device for providing a signal corresponding to a combined AC and DC current through the blocking device;

(b) providing a signal corresponding to the AC current through the blocking device;

(c) summing the signal provided by the low resistance shunt and the signal corresponding to the AC current through the blocking device in phase opposition to provide a DC component signal corresponding to the DC current through the blocking device; and (d) comparing the DC component signal with an allowed DC current level signal to provide a comparison signal which indicates when the DC component signal exceeds the allowed DC current level signal.

34. The method of claim 33 comprising additionally the step of generating an alarm when the comparison signal indicates that the DC component signal exceeds the allowed DC current level signal.

35. A DC blocking device, comprising:

(a) a DC blocking capacitor connected between two terminals of the blocking device;

(b) a main bypass path connected in parallel with the DC blocking capacitor and including a main switching device which is responsive to main triggering signals to create a low impedance path between the terminals of the blocking device;

(c) an auxiliary bypass path connected in parallel with the main bypass path and including a storage capacitor connected in series with an auxiliary switching device which is responsive to first and second auxiliary triggering signals to electrically connect the storage capacitor in parallel with the main bypass path;

(d) an auxiliary charging circuit connected to the storage capacitor and responsive to a control signal to charge the storage capacitor to an auxiliary voltage level; and (e) controller means for providing the first auxiliary triggering signal when a fault condition causes the voltage level across the DC blocking capacitor to exceed a triggering voltage level to allow the storage capacitor to charge to a stored voltage level, for providing the main triggering signal when the storage capacitor is charged to the stored voltage level, for providing the control signal to the auxiliary charging circuit during a period when the main switching devices are on and conducting, and for providing the second auxiliary triggering signal when the fault condition has cleared to apply the stored voltage in the storage capacitor across the main switching devices to commutate them off.

\* \* \* \* \*

UNITED STATES PATENT AND TRADEMARK OFFICE
CERTIFICATE OF CORRECTION

PATENT NO. : 5,751,530
DATED : May 12, 1998
INVENTOR(S) : Brian R. Pelly and Henry N. Tachick It is certified that error appears in the above-indentified patent and that said Letters Patent is hereby corrected as shown below:

In column 6, line 60 of the patent, "vice" should be --device--.

In column 10, line 8 of the patent, "to" (third occurrence) should be --$t_0$--.

In column 10, line 25 of the patent, "storage-capacitor" should be --storage capacitor--.

In column 11, line 18 of the patent, "$t_1$," should be --$t_1$--.

In column 13, line 46 of the patent, "on the capacity" should be --capacitor 68 if--.

In column 21, line 28 of the patent, "backup-" should be --backup--.

Signed and Sealed this

Seventh Day of March, 2000

Attest:

Q. TODD DICKINSON

Attesting Officer

Commissioner of Patents and Trademarks